United States Patent
Inada et al.

(10) Patent No.: US 10,534,238 B2
(45) Date of Patent: Jan. 14, 2020

(54) TRANSMISSION DECORATIVE FILM

(71) Applicant: FUJIFILM Corporation, Tokyo (JP)

(72) Inventors: Hiroshi Inada, Kanagawa (JP); Shigeaki Nimura, Kanagawa (JP); Mitsuyoshi Ichihashi, Kanagawa (JP); Rie Takasago, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/388,892

(22) Filed: Apr. 19, 2019

(65) Prior Publication Data

US 2019/0243043 A1 Aug. 8, 2019

Related U.S. Application Data

(63) Continuation of application No. PCT/JP2017/033511, filed on Sep. 15, 2017.

(30) Foreign Application Priority Data

| Oct. 25, 2016 | (JP) | 2016-208609 |
| Dec. 14, 2016 | (JP) | 2016-242403 |
| Feb. 14, 2017 | (JP) | 2017-025038 |

(51) Int. Cl.
*G02F 1/225* (2006.01)
*G02F 1/1335* (2006.01)
(Continued)

(52) U.S. Cl.
CPC .............. *G02F 1/225* (2013.01); *B32B 7/02* (2013.01); *B32B 7/023* (2019.01); *G02B 5/30* (2013.01);
(Continued)

(58) Field of Classification Search
CPC ...... G02F 1/133536; G02F 1/225; G02F 1/29; G02B 5/3016; G02B 5/3025
See application file for complete search history.

(56) References Cited

U.S. PATENT DOCUMENTS

| 2010/0214657 A1 | 8/2010 | Kuroda et al. |
| 2011/0234946 A1 | 9/2011 | Amimori et al. |

(Continued)

FOREIGN PATENT DOCUMENTS

| JP | 2009300662 | 12/2009 |
| JP | 2010111104 | 5/2010 |

(Continued)

OTHER PUBLICATIONS

"International Search Report (Form PCT/ISA/210) of PCT/JP2017/033511," dated Oct. 31, 2017, with English translation thereof, pp. 1-5.

(Continued)

*Primary Examiner* — Dung T Nguyen
(74) *Attorney, Agent, or Firm* — JCIPRNET

(57) ABSTRACT

An object of the present invention is to provide a transmission decorative film having transparency and capable of applying different visual effects on observation surfaces. The transmission decorative film includes: a linear polarization plate; a first λ/4 plate laminated on one main surface of the linear polarization plate; a first cholesteric liquid crystalline layer laminated on the first λ/4 plate; a second λ/4 plate laminated on the other main surface of the linear polarization plate; and a second cholesteric liquid crystalline layer laminated on the second λ/4 plate, in which the first cholesteric liquid crystalline layer and the second cholesteric liquid crystalline layer respectively have wavelength selective reflectivity and reflect light which is right circularly polarized light or left circularly polarized light at a selective reflection wavelength.

17 Claims, 17 Drawing Sheets

(51) Int. Cl.
  *G02B 5/30* (2006.01)
  *B32B 7/023* (2019.01)
  *B32B 7/02* (2019.01)
  *G09F 19/12* (2006.01)
  *G02F 1/29* (2006.01)

(52) U.S. Cl.
  CPC ..... *G02B 5/3016* (2013.01); *G02F 1/133528* (2013.01); *G02F 1/133536* (2013.01); *G02F 1/29* (2013.01); *G09F 19/12* (2013.01); *B32B 2305/55* (2013.01); *B32B 2307/42* (2013.01)

(56) References Cited

U.S. PATENT DOCUMENTS

| | | | |
|---|---|---|---|
| 2012/0262767 A1 | 10/2012 | Ida | |
| 2013/0083276 A1* | 4/2013 | Iwahashi | B41M 3/06 |
| | | | 349/117 |
| 2018/0356644 A1 | 12/2018 | Kuroda et al. | |
| 2019/0243045 A1* | 8/2019 | Inada | B32B 7/02 |

FOREIGN PATENT DOCUMENTS

| | | |
|---|---|---|
| JP | 2010221685 | 10/2010 |
| JP | 2011201240 | 10/2011 |
| WO | 2011092922 | 8/2011 |

OTHER PUBLICATIONS

"Written Opinion of the International Searching Authority (Form PCT/ISA/237) of PCT/JP2017/033511," dated Oct. 31, 2017, with English translation thereof, pp. 1-7.

\* cited by examiner

TRANSMISSION DECORATIVE FILM

CROSS-REFERENCE TO RELATED APPLICATIONS

This application is a Continuation of PCT International Application No. PCT/JP2017/033511 filed on Sep. 15, 2017, which claims priority under 35 U.S.C. § 119(a) to Japanese Patent Application No. 2016-208609 filed on Oct. 25, 2016, Japanese Patent Application No. 2016-242403 filed on Dec. 14, 2016 and Japanese Patent Application No. 2017-025038 filed on Feb. 14, 2017. Each of the above applications is hereby expressly incorporated by reference, in its entirety, into the present application.

BACKGROUND OF THE INVENTION

1. Field of the Invention

The present invention relates to a transmission decorative film.

2. Description of the Related Art

A layer including a cholesteric liquid crystalline phase is known as a layer having properties of selectively reflecting any one of right circularly polarized light or left circularly polarized light in a specific wavelength range. Accordingly, the cholesteric liquid crystalline layer is applied for various uses, and for example, applied for a display device for displaying images having partially different color tones (JP2009-300662A).

SUMMARY OF THE INVENTION

Meanwhile, recently, there are various demands for decorative films capable of displaying specific images and the like, and for example, a transmission type decorative film (transmission decorative film) that is capable of visually recognizing a scene of the other side through the film, capable of visually recognizing a specific display from one side (front surface), and substantially not capable of visually recognizing the display from the other side (rear surface). Particularly, from the rear surface, in a case where not only the specific display substantially displayed on the front surface cannot be visually recognized, but also a display of a color tone or a display of an image which is completely different from the specific display can be displayed, the decorative effect further increases.

A liquid crystal display device disclosed in examples of JP2009-300662A mainly aims at displaying an image formed on a liquid crystal layer (image that can be obtained by including two or more regions having reflection center wavelengths different from each other, in the cholesteric liquid crystalline layer) with a higher tone, and there is no research for an aspect in which the displayed image differs depending on an observation surface. The examples of JP2009-300662A aims at effectively showing a tone of a liquid crystal layer, and a thick light absorption layer is formed on a side opposite to the liquid crystal layer using a black ink. Accordingly, in a case of performing the observation using the surface on a side opposite to the liquid crystal layer as the observation surface, the scenery outside cannot be seen through the layer.

The present invention is made in consideration of these circumstances and an object thereof is to provide a transmission decorative film having transparency and capable of applying different visual effects on observation surfaces.

As a result of intensive studies regarding the problems of technologies of the related art, the inventors have found that the problems described above can be solved by including a linear polarization plate, a first $\lambda/4$ plate laminated on one main surface of the linear polarization plate, a first cholesteric liquid crystalline layer laminated on the first $\lambda/4$ plate, a second $\lambda/4$ plate laminated on the other main surface of the linear polarization plate, and a second cholesteric liquid crystalline layer laminated on the second $\lambda/4$ plate, causing the first cholesteric liquid crystalline layer and the second cholesteric liquid crystalline layer to respectively have wavelength selective reflectivity, and reflecting light which is right circularly polarized light or left circularly polarized light at a selective reflection wavelength.

That is, the inventors have found that the object described above can be achieved with the following configurations.

(1) A transmission decorative film comprising: a linear polarization plate; a first $\lambda/4$ plate laminated on one main surface of the linear polarization plate; a first cholesteric liquid crystalline layer laminated on the first $\lambda/4$ plate; a second $\lambda/4$ plate laminated on the other main surface of the linear polarization plate; and a second cholesteric liquid crystalline layer laminated on the second $\lambda/4$ plate, in which the first cholesteric liquid crystalline layer and the second cholesteric liquid crystalline layer respectively have wavelength selective reflectivity and reflect right circularly polarized light or left circularly polarized light at a selective reflection wavelength.

(2) The transmission decorative film according to (1), in which at least one of the first cholesteric liquid crystalline layer or the second cholesteric liquid crystalline layer includes two or more reflection regions having different selective reflection wavelengths.

(3) The transmission decorative film according to (2), in which the first cholesteric liquid crystalline layer and the second cholesteric liquid crystalline layer respectively include two or more reflection regions having different selective reflection wavelengths, and a formation pattern in the reflection region of the first cholesteric liquid crystalline layer and a formation pattern in the reflection region of the second cholesteric liquid crystalline layer are different from each other, when seen from one main surface side of the linear polarization plate.

(4) The transmission decorative film according to any one of (1) to (3), in which at least one of the first cholesteric liquid crystalline layer or the second cholesteric liquid crystalline layer is laminated on a part of the first $\lambda/4$ plate or the second $\lambda/4$ plate.

(5) The transmission decorative film according to (4), further comprising: a filling layer which covers a side surface of the cholesteric liquid crystalline layer laminated on a part of the $\lambda/4$ plate and a surface of the $\lambda/4$ plate where the cholesteric liquid crystalline layer is not formed.

(6) The transmission decorative film according to (5), in which a surface of the filling layer is flush with the surface of the cholesteric liquid crystalline layer.

(7) The transmission decorative film according to (5), in which a thickness of the filling layer is equal to or greater than a thickness of the cholesteric liquid crystalline layer.

(8) The transmission decorative film according to any one of (1) to (7), in which a combination of the linear polarization plate and the first $\lambda/4$ plate functions as a circular polarization plate which transmits circularly polarized light having a revolution direction which is opposite to that of circularly polarized light reflected by the first cholesteric liquid crystalline layer, and a combination of the linear polarization plate and the second λ/4 plate functions as a circular polarization plate which transmits circularly polarized light having a revolution direction which is opposite to that of circularly polarized light reflected by the second cholesteric liquid crystalline layer.

(9) The transmission decorative film according to any one of (1) to (8), in which at least one of the first cholesteric liquid crystalline layer or the second cholesteric liquid crystalline layer is formed by laminating two or more reflection layers having different selective reflection wavelengths at least in a part of region in a plane direction.

According to the present invention, it is possible to provide a transmission decorative film having transparency and capable of applying different visual effects on observation surfaces.

DESCRIPTION OF THE PREFERRED EMBODIMENTS

Figure 1:
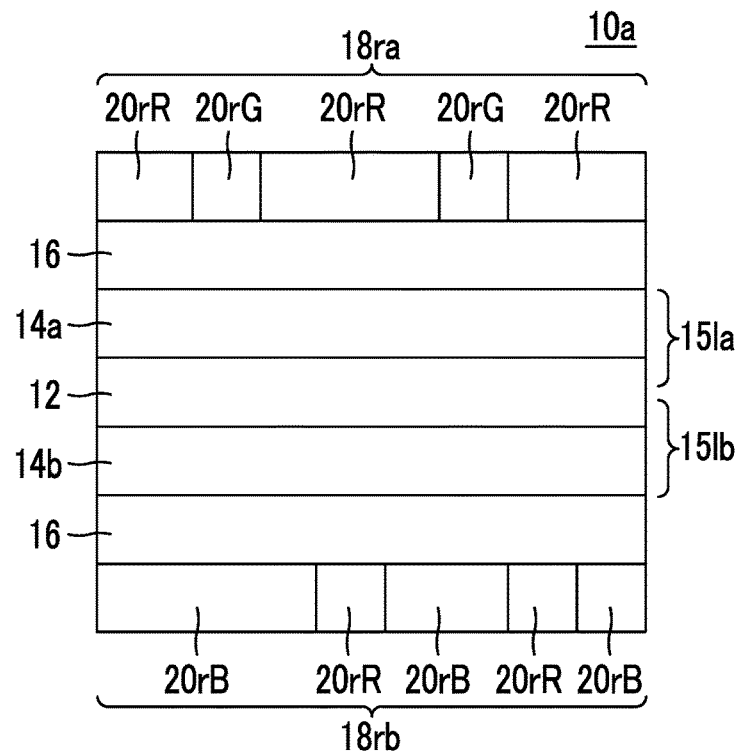
FIG. 1 is cross section view schematically showing an example of a transmission decorative film of the present invention.

Hereinafter, a transmission decorative film of the present invention will be described in detail. In the present specification, a range of numerical values shown using "to" means a range including numerical values before and after "to" as a lower limit value and an upper limit value. In the present specification, the description regarding "orthogonal" and "parallel" include a range of errors allowed in the technical field of the present invention. For example, the term "orthogonal" and "parallel" means a range of less than ±10° from an exact orthogonal or parallel state, and the error from the exact orthogonal or parallel state is preferably equal to or smaller than 5° and more preferably equal to or smaller than 3°.

In addition, an angle other than the angles described as "orthogonal" and "parallel", for example, a specific angle such as 15° or 45° also includes a range of errors allowed in the technical field of the present invention. For example, in the present invention, the angle means an angle less than ±5° of the specifically shown exact angle, and the error of the specifically shown exact angle is preferably equal to or smaller than ±3° and more preferably equal to or smaller than ±1°.

In the present specification, a term "(meth)acrylate" is used as meaning of "any one or both of acrylate and methacrylate".

In the present specification, the "same" includes a range of errors generally allowed in the technical field. In addition, in the present specification, in a case where the expressions "entire portion", "all of", or "entire surface" are used, the expressions include a range of errors generally allowed in the technical field, in addition to a case of 100%, and for example, include a case of 99% or more, 95% or more, or 90% or more.

Visible light is light having wavelengths which are visually recognizable by a person among electromagnetic waves and indicates light in a wavelength range of 380 nm to 780 nm. Invisible light is light in a wavelength range less than 380 nm or a wavelength range exceeding 780 nm.

Although it is not limited to this, in the visible light, light in a wavelength range of 420 nm to 490 nm is blue light, light in a wavelength range of 495 nm to 570 nm is green light, and light in a wavelength range of 620 nm to 750 nm is red light.

Infrared light among the red light is electromagnetic waves in a wavelength range of 780 nm to 2,500 nm. Ultraviolet light is light in a wavelength range of 10 to 380 nm.

In this specification, the selective reflection wavelength is an average value of two wavelengths showing half value transmittance: T½ (%) shown with the following equation, in a case where a minimum value of transmittance of a target product (member) is set as Tmin (%).

Equation for acquiring half value transmittance: T½=100−(100−Tmin)/2

In the present specification, the "haze" means a value measured with a haze meter NDH-2000 manufactured by Nippon Denshoku Industries Co., Ltd.

Theoretically, the haze means a value represented by the following expression.

(scattering transmittance of natural light at 380 to 780 nm)/(scattering transmittance of natural light+linear transmittance of natural light at 380 to 780 nm)×100%

A scattering transmittance is a value which can be calculated by subtracting a linear transmittance from an omnidirectional transmittance obtained by using a spectrophotometer and an integrating sphere unit. The linear transmittance is a transmittance at 0°, based on a value measured by using the integrating sphere unit. That is, a low haze means a great amount of linear transmittance among the entire amount of transmittance.

A refractive index is a refractive index with respect to light at a wavelength of 589.3 nm.

In the present specification, Re(λ) and Rth(λ) respectively represent a retardation in a plane at a wavelength λ and a retardation in a thickness direction. Unless otherwise noted, the wavelength λ is 550 nm.

In the present specification, Re(λ) and Rth(λ) is a value measured at a wavelength λ with AxoScan OPMF-1 (manufactured by Opto Science, Inc.). By inputting an average refractive index ((Nx+Ny+Nz)/3) and a film thickness (d (μm)) to AxoScan, Slow axis direction (°)

$Re(\lambda)=R0(\lambda)$ $Rth(\lambda)=((Nx+Ny)/2-Nz)\times d$ is calculated.

R0(λ) is a value displayed as a numerical value calculated by AxoScan and means Re(λ).

In the present specification, the refractive indexes Nx, Ny, and Nz are measured by using Abbe refractometer (NAR-4T, manufactured by Atago Co., Ltd.) and a sodium vapor lamp (λ=589 nm) as a light source. In addition, in a case of measuring wavelength dependency, multi-wavelength Abbe refractometer DR-M2 (manufactured by Atago Co., Ltd.) can be measured in combination with an interference filter.

In addition, values of polymer hand book (John Wiley & Sons, Inc.) and a catalogue of various optical films can also be used. Values of average refractive indexes of main optical film are shown as follows: cellulose acylate (1.48), cycloolefin polymer (1.52), polycarbonate (1.59), polymethyl methacrylate (1.49), polystyrene (1.59).

The transmission decorative film of the embodiment of the present invention is a transmission decorative film including: a linear polarization plate; a first λ/4 plate laminated on one main surface of the linear polarization plate; a first cholesteric liquid crystalline layer laminated on the first λ/4 plate; a second λ/4 plate laminated on the other main surface of the linear polarization plate; and a second cholesteric liquid crystalline layer laminated on the second λ/4 plate, in which the first cholesteric liquid crystalline layer and the second cholesteric liquid crystalline layer respectively have wavelength selective reflectivity and reflect light which is right circularly polarized light or left circularly polarized light at a selective reflection wavelength.

<Transmission Decorative Film>

Hereinafter, an example of a preferred embodiment of the transmission decorative film of the present invention will be described with reference to the drawings.

FIG. 1 shows cross section view schematically showing an example of the transmission decorative film of the embodiment of the present invention.

The drawing of the present invention is a schematic view and a relationship between thicknesses, a positional relationship, and the like of layers do not necessarily correspond to actual figures. The same applies to the drawings hereinafter.

As shown in FIG. 1, a transmission decorative film 10a includes a first cholesteric liquid crystalline layer 18ra, a pressure sensitive adhesive layer 16, a first λ/4 plate 14a, a linear polarization plate 12, a second λ/4 plate 14b, a pressure sensitive adhesive layer 16, and a second cholesteric liquid crystalline layer 18rb in this order.

That is, the transmission decorative film 10a has a configuration in which the first λ/4 plate 14a is laminated on one main surface of the linear polarization plate 12, the first cholesteric liquid crystalline layer 18ra is laminated on the first λ/4 plate 14a through the pressure sensitive adhesive layer 16, the second λ/4 plate 14b is laminated on the other main surface of the linear polarization plate 12, and the second cholesteric liquid crystalline layer 18rb is laminated on the second λ/4 plate 14b through the pressure sensitive adhesive layer 16.

Other various functional layers may be included between the layers. For example, a pressure sensitive adhesive layer for bonding the linear polarization plate 12 and the λ/4 plate (first λ/4 plate 14a or second λ/4 plate 14b) and a protective layer for protecting the cholesteric liquid crystalline layer (first cholesteric liquid crystalline layer 18ra or second cholesteric liquid crystalline layer 18rb) may be provided.

(Cholesteric Liquid Crystalline Layer)

The first cholesteric liquid crystalline layer 18ra includes a red right circular polarization reflection region 20rR which reflects right circularly polarized light of light at a wavelength of 620 nm to 750 nm (that is, red light) and transmits left circularly polarized red light and light in other wavelength ranges, and a green right circular polarization reflection region 20rG which reflects right circularly polarized light of light at a wavelength of 495 nm to 570 nm (that is, green light) and transmits left circularly polarized green light and light in other wavelength ranges.

In addition, the second cholesteric liquid crystalline layer 18rb includes the red right circular polarization reflection region 20rR, and a blue right circular polarization reflection region 20rB which reflects right circularly polarized light of light at a wavelength of 420 nm to 490 nm (that is, blue light) and transmits left circularly polarized blue light and light in other wavelength ranges.

The red right circular polarization reflection region 20rR, green right circular polarization reflection region 20rG, the blue right circular polarization reflection region 20rB, and a red left circular polarization reflection region 20lR, a green left circular polarization reflection region 20lG, and a blue left circular polarization reflection region 20lB which will be described later respectively include a cholesteric liquid crystalline phase and have wavelength selective reflectivity with respect to circularly polarized light in one direction in a specific wavelength range.

The red right circular polarization reflection region 20rR, green right circular polarization reflection region 20rG, the blue right circular polarization reflection region 20rB, and a red left circular polarization reflection region 20lR, a green left circular polarization reflection region 20lG, and a blue left circular polarization reflection region 20lB which will be described later have the same configurations as each other, except that the selective reflection wavelengths and polarization directions of reflected light are different from each other, and accordingly, in the following description, these are collectively referred to as a reflection region.

A selective reflection wavelength λ of the cholesteric liquid crystalline phase depends on a pitch P (=period of helix) of a helical structure of the cholesteric liquid crystalline phase and is in a relationship of an average refractive index of the cholesteric liquid crystalline phase and λ=n×P. Accordingly, the selective reflection wavelength can be adjusted by adjusting the pitch of the helical structure. The pitch of the cholesteric liquid crystalline phase depends on the kind of a chiral agent used with a polymerizable liquid crystal compound or an added concentration thereof, and thus, a desired pitch can be obtained by adjusting these.

A half-width Δλ (nm) of the selective reflection region (circular polarization reflection region) showing the selective reflection depends on a refractive index anisotropy Δn of the cholesteric liquid crystalline phase and a pitch P of the helix, and is in a relationship of Δλ=Δn×P. Accordingly, a width of the selective reflection region can be controlled by adjusting Δn. Δn can be adjusted in accordance with the kind of the liquid crystal compound forming the reflection region, a mixing ratio thereof, and a temperature during the alignment. It is known that a reflectivity of the cholesteric liquid crystalline phase depends on Δn, and in a case of obtaining the same degree of the reflectivity, as Δn increases, the number of helical pitches decreases, that is, a film thickness can be decreased.

As a measuring method of the sense or pitch of the helix, methods disclosed in "Introduction: Liquid Crystal Experiments" (edited by the Japanese Liquid Crystal Society, Sigma Publications, published in 2007 p. 46) and "Liquid Crystal Handbook" (Liquid Crystal Handbook Editorial Committee, Maruzen Publishing, p. 196) can be used.

The reflected light of the cholesteric liquid crystalline phase is circularly polarized light. The fact whether or not the reflected light is right circularly polarized light or left circularly polarized light depends on a twisted direction of the helix of the cholesteric liquid crystalline phase. Regarding the selective reflection of the circularly polarized light due to the cholesteric liquid crystalline phase, in a case where the twisted direction of the helix of the cholesteric liquid crystalline phase is right, the right circularly polarized light is reflected, and in a case where the twisted direction of the helix of the cholesteric liquid crystalline phase is left, the left circularly polarized light is reflected.

Accordingly, in the transmission decorative film 10a, the red right circular polarization reflection region 20rR, the green right circular polarization reflection region 20rG, and the blue right circular polarization reflection region 20rB are layers including a right-twisted cholesteric liquid crystalline phase. In addition, the red left circular polarization reflection region 20lR, the green left circular polarization reflection region 20lG, and the blue left circular polarization reflection region 20lB of a transmission decorative film 10b shown in FIG. 5 which will be described later include a layer including a left-twisted cholesteric liquid crystalline phase.

A direction of revolution of the cholesteric liquid crystalline phase can be adjusted in accordance with the kinds of a liquid crystal compound forming the reflection region or the kinds of a chiral agent to be added.

The reflection region may be formed of 1 layer and may have a multiplayer configuration.

The widening of the wavelength range of reflected light can be realized by laminating layers having the shifted selective reflection wavelength λ in order. In addition, a technology of widening the wavelength range by a method of changing the helical pitch in the layer stepwise which is called a pitch gradient method has been known, and examples thereof include methods disclosed in Nature 378, 467-469 (1995), JP1994-281814A (JP-H06-281814A), and JP4990426B.

In the present invention, the selective reflection wavelength in the reflection region can be set in any range of visible light (approximately 380 to 780 nm) and near infrared light (approximately 780 to 2,000 nm) and the setting method thereof is as described above.

Here, as described above, in the transmission decorative film 10a shown in FIG. 1, the first cholesteric liquid crystalline layer 18ra and the second cholesteric liquid crystalline layer 18rb include two reflection regions having different selective reflection wavelengths, respectively.

That is, in the first cholesteric liquid crystalline layer 18ra, the red right circular polarization reflection region 20rR and the green right circular polarization reflection region 20rG are formed in a desired pattern. In addition, in the second cholesteric liquid crystalline layer 18rb, the red right circular polarization reflection region 20rR and the blue right circular polarization reflection region 20rB are formed in a desired pattern.

In FIG. 1, each cholesteric liquid crystalline layer is configured to include two kinds of the reflection regions having different selective reflection wavelengths, but the configuration is not limited thereto, and a configuration including three or more kinds of reflection regions may be used.

In the transmission decorative film 10a shown in FIG. 1, a formation pattern in the reflection region of the first cholesteric liquid crystalline layer 18ra and a formation pattern in the reflection region of the second cholesteric liquid crystalline layer 18rb, in a view from the first cholesteric liquid crystalline layer 18ra side (that is, in a view from one main surface side of the linear polarization plate 12) are different from each other.

(λ/4 Plate)

The first λ/4 plate 14a and the second λ/4 plate 14b are well-known λ/4 plates. In a case where light incident to the λ/4 plate is linearly polarized light, the λ/4 plate outputs circularly polarized light, and in a case where light incident to the λ/4 plate is circularly polarized light, the λ/4 plate outputs linearly polarized light.

The first λ/4 plate 14a and the second λ/4 plate 14b have basically the same configuration, except the different positions, and therefore, these are collectively referred to as the λ/4 plate 14, in a case where there is no necessity of distinguishing.

The λ/4 plate (plate have λ/4 function) is a plate having a function of converting a linearly polarized light at a specific wavelength into a circularly polarized light or a circularly polarized light to a linearly polarized light. More specifically, the λ/4 plate is a plate in which an in-plane retardation value at a predetermined wavelength λ nm is Re(λ)=λ/4 (or odd number times thereof). This equation may be achieved at any wavelength (for example, 550 nm) in a visible light range.

The λ/4 plate may be configured of only an optically anisotropic layer having a λ/4 function or may have a configuration in which an optically anisotropic layer having a λ/4 function is formed on a support, and in a case where the λ/4 plate includes a support, a combination of the support and the optically anisotropic layer means the λ/4 plate.

As the λ/4 plate, a well-known λ/4 plate can be used.

In the transmission decorative film of the embodiment of the present invention, the λ/4 plate preferably has small Rth(550) which is a retardation in a thickness direction.

Specifically, Rth(550) is preferably −50 nm to 50 nm and more preferably −30 nm to 30 nm, and Rth(λ) is even more preferably zero. Accordingly, a preferable result is obtained, from a viewpoint of converting the circularly polarized light obliquely incident to the λ/4 plate into the linearly polarized light.

Here, the first λ/4 plate 14a is disposed in accordance with a slow axis so that the incident left circularly polarized light transmitted through the first cholesteric liquid crystalline layer 18ra becomes linearly polarized light.

In the same manner, the second λ/4 plate 14b is disposed in accordance with a slow axis so that the incident left circularly polarized light transmitted through the second cholesteric liquid crystalline layer 18rb becomes linearly polarized light.

(Linear Polarization Plate)

The linear polarization plate 12 has a polarization axis in one direction and has a function of transmitting a specific linearly polarized light.

As the linear polarization plate 12, a typical linear polarization plate such as an absorption type polarization plate including an iodine compound or a reflective type polarization plate such as wire grid can be used. The polarization axis is the same as a transmission axis.

As the absorption type polarization plate, any of an iodine-based polarization plate, a dye-based polarization plate using a dichroic dye, and a polyene-based polarization plate. The iodine-based polarization plate and the dye-based polarization plate are generally manufactured by adsorbing iodine or a dichroic dye to polyvinyl alcohol and stretching.

Here, the linear polarization plate 12 is disposed in accordance with a polarization axis so that the incident linearly polarized light transmitted through the first λ/4 plate 14a is transmitted. Accordingly, a combination of the linear polarization plate 12 and the first λ/4 plate 14a functions as a left circular polarization plate (in FIG. 1, first left circular polarization plate 151a) which transmits left circularly polarized light as linearly polarized light, among the light incident from the first λ/4 plate 14a side. That is, a combination of the first λ/4 plate 14a and the linear polarization plate 12 transmits circularly polarized light having a revolution direction opposite to a revolution direction of the circularly polarized light reflected by the first cholesteric liquid crystalline layer 18ra.

The linear polarization plate 12 is disposed in accordance with a polarization axis so that the incident linearly polarized light transmitted through the second λ/4 plate 14b is transmitted. Accordingly, a combination of the linear polarization plate 12 and the second λ/4 plate 14b functions as a left circular polarization plate (in FIG. 1, second left circular polarization plate 151b) which transmits left circularly polarized light as linearly polarized light, among the light incident from the second λ/4 plate 14b side. That is, a combination of the second λ/4 plate 14b and the linear polarization plate 12 transmits circularly polarized light having a revolution direction opposite to a revolution direction of the circularly polarized light reflected by the second cholesteric liquid crystalline layer 18rb.

(Pressure Sensitive Adhesive Layer)

The pressure sensitive adhesive layer 16 is disposed between the first cholesteric liquid crystalline layer 18ra and the first kg plate 14a, and bonds the first cholesteric liquid crystalline layer 18ra and the first λ/4 plate 14a to each other. In addition, the pressure sensitive adhesive layer 16 is disposed between the second cholesteric liquid crystalline layer 18rb and the second λ/4 plate 14b, and bonds the second cholesteric liquid crystalline layer 18rb and the second λ/4 plate 14b to each other.

The pressure sensitive adhesive layer 16 formed of various well-known materials can be used, as long as it is a material which can bond target layers (sheet-like material), and the pressure sensitive adhesive layer may be a layer formed of an adhesive which has fluidity during the adhesion and becomes a solid matter thereafter, a layer formed of a pressure sensitive adhesive which is a flexible gelatinous (rubber-like) solid matter during the adhesion and the gelatinous state of which is not changed thereafter, or a layer formed of a material having properties of both the adhesive and the pressure sensitive adhesive. Therefore, as the pressure sensitive adhesive layer 16, a well-known layer used for bonding a sheet-like material such as an optical clear adhesive (OCA), an optical clear double-sided tape, or an ultraviolet curable resin may be used.

Figure 2:
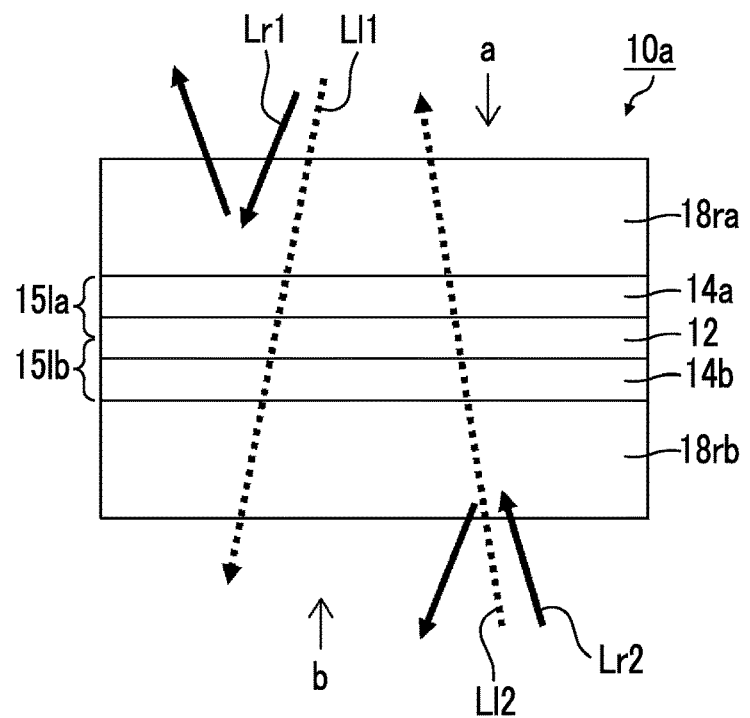
FIG. 2 is a schematic view for describing an operation of the transmission decorative film shown in FIG. 1.

Next, the operation of the transmission decorative film 10a configured as described above will be described with reference to FIGS. 2 to 4. In FIG. 2, the reflection region of each of the first cholesteric liquid crystalline layer 18ra and the second cholesteric liquid crystalline layer 18rb, and the pressure sensitive adhesive layer 16 are omitted.

As shown in FIG. 2, among the light incident to the transmission decorative film 10a from the first cholesteric liquid crystalline layer 18ra side, a right circularly polarized light Lr1 at the selective reflection wavelength of the first cholesteric liquid crystalline layer 18ra (reflection region) is reflected by the first cholesteric liquid crystalline layer 18ra.

Meanwhile, among the light incident to the transmission decorative film 10a from the first cholesteric liquid crystalline layer 18ra side, a left circularly polarized light Ll1 is transmitted through the first cholesteric liquid crystalline layer 18ra and is incident to the first λ/4 plate 14a. The left circularly polarized light Ll1 transmitted through the first cholesteric liquid crystalline layer 18ra is converted into linearly polarized light by the first λ/4 plate 14a and is incident to the linear polarization plate 12. The linear polarization plate 12 is disposed in accordance with the polarization axis so that the linearly polarized light converted by the first λ/4 plate 14a is transmitted, and accordingly, the linearly polarized light converted by the first λ/4 plate 14a is transmitted through the linear polarization plate 12. The linearly polarized light transmitted through the linear polarization plate 12 is incident to the second λ/4 plate 14*b* and is converted into left circularly polarized light. The left circularly polarized light converted by the second λ/4 plate 14*b* is transmitted through the second cholesteric liquid crystalline layer 18*rb*.

In the same manner, among the light incident to the transmission decorative film 10*a* from the second cholesteric liquid crystalline layer 18*rb* side, a right circularly polarized light Lr2 at the selective reflection wavelength of the second cholesteric liquid crystalline layer 18*rb* (reflection region) is reflected by the second cholesteric liquid crystalline layer 18*rb*.

Meanwhile, among the light incident to the transmission decorative film 10*a* from the second cholesteric liquid crystalline layer 18*rb* side, a left circularly polarized light Ll2 is transmitted through the second cholesteric liquid crystalline layer 18*rb* and is incident to the second λ/4 plate 14*b*. The left circularly polarized light Ll2 transmitted through the second cholesteric liquid crystalline layer 18*rb* is converted into linearly polarized light by the second λ/4 plate 14*b* and is incident to the linear polarization plate 12. The linear polarization plate 12 is disposed in accordance with the polarization axis so that the linearly polarized light converted by the second λ/4 plate 14*b* is transmitted, and accordingly, the linearly polarized light converted by the second λ/4 plate 14*b* is transmitted through the linear polarization plate 12. The linearly polarized light transmitted through the linear polarization plate 12 is incident to the first λ/4 plate 14*a* and is converted into left circularly polarized light. The left circularly polarized light converted by the first λ/4 plate 14*a* is transmitted through the first cholesteric liquid crystalline layer 18*ra*.

Therefore, in a case where the transmission decorative film 10*a* is observed from the first cholesteric liquid crystalline layer 18*ra* side (in FIG. 2, in a view in the a direction), the scene of the other side of the transmission decorative film 10*a* (second cholesteric liquid crystalline layer 18*rb* side) is visually recognized by the left circularly polarized light transmitted and incident from the second cholesteric liquid crystalline layer 18*rb* side, and the light at the selective reflection wavelength of the reflection region of the first cholesteric liquid crystalline layer 18*ra* is visually recognized.

Figure 3:
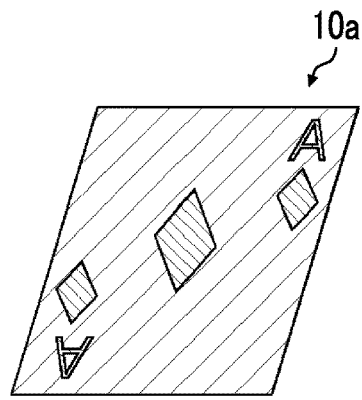
FIG. 3 is a view showing FIG. 2 in an a direction.

That is, in a view in the a direction in FIG. 2, an image having a pattern according to the formation pattern of the reflection region of the first cholesteric liquid crystalline layer 18*ra* is visually recognized, without the effect to the formation pattern of the second cholesteric liquid crystalline layer 18*rb* (FIG. 3).

In the same manner, in a case where the transmission decorative film 10*a* is observed from the second cholesteric liquid crystalline layer 18*rb* side (in FIG. 2, in a view in the b direction), the scene of the other side of the transmission decorative film 10*a* (the first cholesteric liquid crystalline layer 18*ra* side) is visually recognized by the left circularly polarized light transmitted and incident from the first cholesteric liquid crystalline layer 18*ra* side, and the light at the selective reflection wavelength of the reflection region of the second cholesteric liquid crystalline layer 18*rb* is visually recognized.

Figure 4:
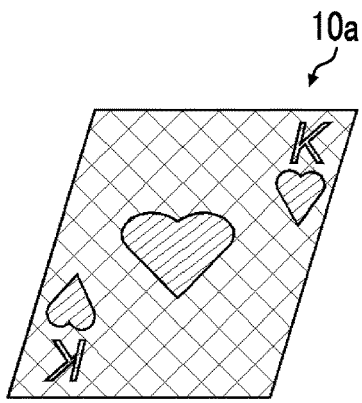
FIG. 4 is a view showing FIG. 2 in a b direction.

That is, in a view in the b direction in FIG. 2, an image having a pattern according to the formation pattern of the reflection region of the second cholesteric liquid crystalline layer 18*rb* is visually recognized, without the effect to the formation pattern of the first cholesteric liquid crystalline layer 18*ra* (FIG. 4).

Therefore, the transmission decorative film 10*a* can have a pattern of an image seen from one surface side (a direction) and a pattern of an image seen from the other surface side (b direction) different from each other, while having transparency, and can apply different visual effects on observation surfaces.

Here, in the example shown in FIG. 1, the first cholesteric liquid crystalline layer 18*ra* and the second cholesteric liquid crystalline layer 18*rb* are respectively configured to reflect right circularly polarized light at the selective reflection wavelength of the reflection region, and there is no limitation.

Figure 5:
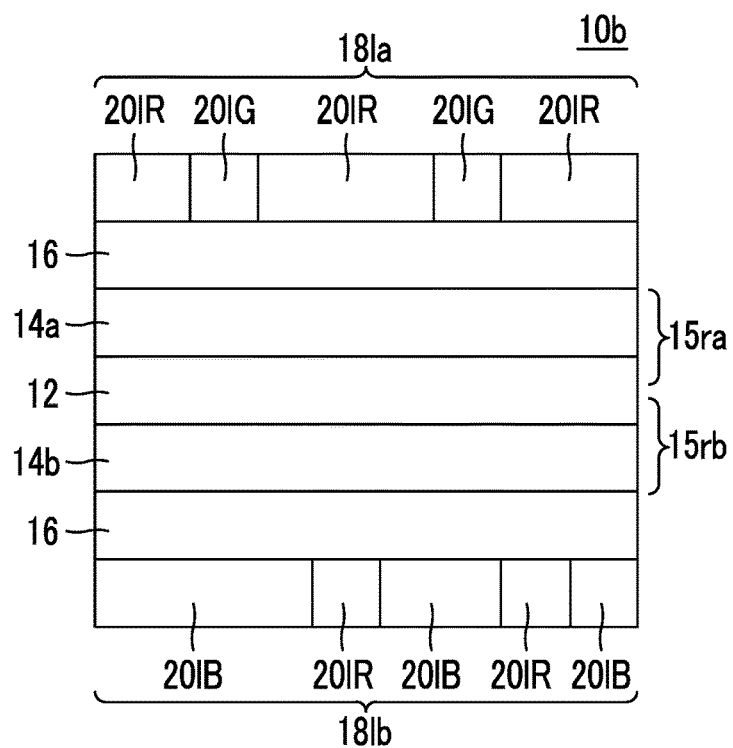
FIG. 5 is a cross section view schematically showing another example of the transmission decorative film of the present invention.

A transmission decorative film 10*b* shown in FIG. 5 includes a first cholesteric liquid crystalline layer 18*la*, the pressure sensitive adhesive layer 16, the first λ/4 plate 14*a*, the linear polarization plate 12, the second λ/4 plate 14*b*, the pressure sensitive adhesive layer 16, and a second cholesteric liquid crystalline layer 18*lb* in this order.

The first cholesteric liquid crystalline layer 18*la* includes the red left circular polarization reflection region 20*l*R which reflects left circularly polarized red light and transmits right circularly polarized red light and light in other wavelength ranges, and the green left circular polarization reflection region 20*l*G which reflects left circularly polarized green light and transmits right circularly polarized green light and light in other wavelength ranges.

The second cholesteric liquid crystalline layer 18*lb* includes the red left circular polarization reflection region 20*l*R, and the blue left circular polarization reflection region 20*l*B which reflects left circularly polarized blue light and transmits right circularly polarized blue light and light in other wavelength ranges.

In the transmission decorative film 10*b*, a combination of the linear polarization plate 12 and the first λ/4 plate 14*a* is disposed in accordance with the slow axis and the polarization axis, so as to function as a right circular polarization plate (in FIG. 5, first right circular polarization plate 15*ra*) which transmits right circularly polarized light as linearly polarized light among the light incident from the first λ/4 plate 14*a* side. In addition, a combination of the linear polarization plate 12 and the second λ/4 plate 14*b* is disposed in accordance with the slow axis and the polarization axis, so as to function as a right circular polarization plate (in FIG. 5, second right circular polarization plate 15*rb*) which transmits right circularly polarized light as linearly polarized light among the light incident from the second λ/4 plate 14*b* side.

As described above, also, in a case where the first cholesteric liquid crystalline layer 18*la* and the second cholesteric liquid crystalline layer 18*lb* are configured to reflect left circularly polarized light at the selective reflection wavelength, respectively, the transmission decorative film 10*b* can have a pattern of an image seen from one surface side and a pattern of an image seen from the other surface side different from each other, while having transparency.

Figure 6:
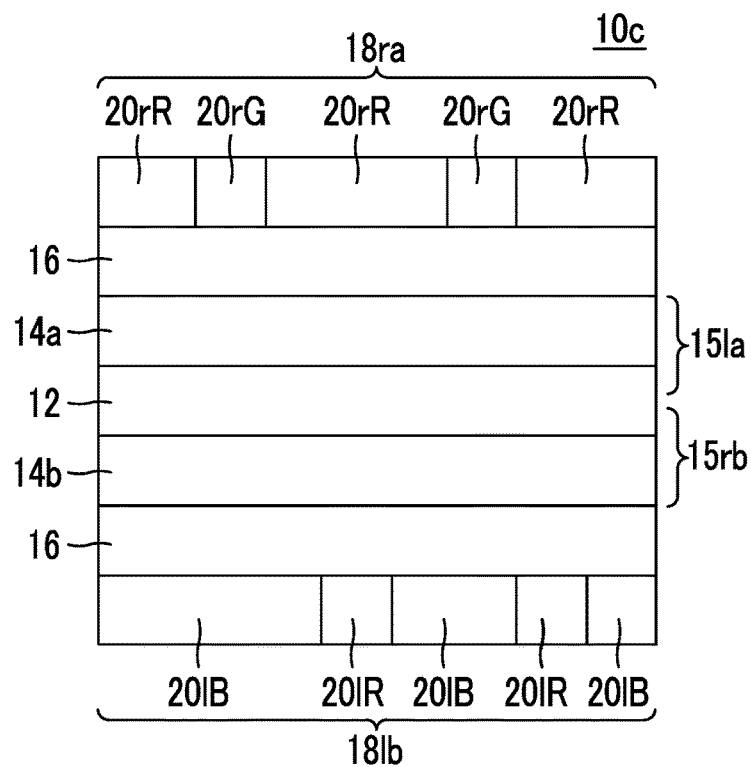
FIG. 6 is a cross section view schematically showing another example of the transmission decorative film of the present invention.

In addition, a transmission decorative film 10*c* shown in FIG. 6 includes a first cholesteric liquid crystalline layer 18*ra*, the pressure sensitive adhesive layer 16, the first λ/4 plate 14*a*, the linear polarization plate 12, the second λ/4 plate 14*b*, the pressure sensitive adhesive layer 16, and a second cholesteric liquid crystalline layer 18*lb* in this order.

The first cholesteric liquid crystalline layer 18*ra* includes the reflection region reflecting the right circularly polarized light at the selective reflection wavelength, in the same manner as the first cholesteric liquid crystalline layer 18*ra* of the transmission decorative film 10*a* of FIG. 1.

In addition, the second cholesteric liquid crystalline layer 18*lb* includes the reflection region reflecting the left circularly polarized light at the selective reflection wavelength, in the same manner as the second cholesteric liquid crystalline layer 18lb of the transmission decorative film 10b of FIG. 5.

In the transmission decorative film 10c, a combination of the linear polarization plate 12 and the first λ/4 plate 14a is disposed in accordance with the slow axis and the polarization axis, so as to function as a left circular polarization plate (in FIG. 6, first left circular polarization plate 151a) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a right circular polarization plate (in FIG. 6, second right circular polarization plate 15rb) which transmits right circularly polarized light as linearly polarized light among the light incident from the second λ/4 plate 14b side.

Figure 7:
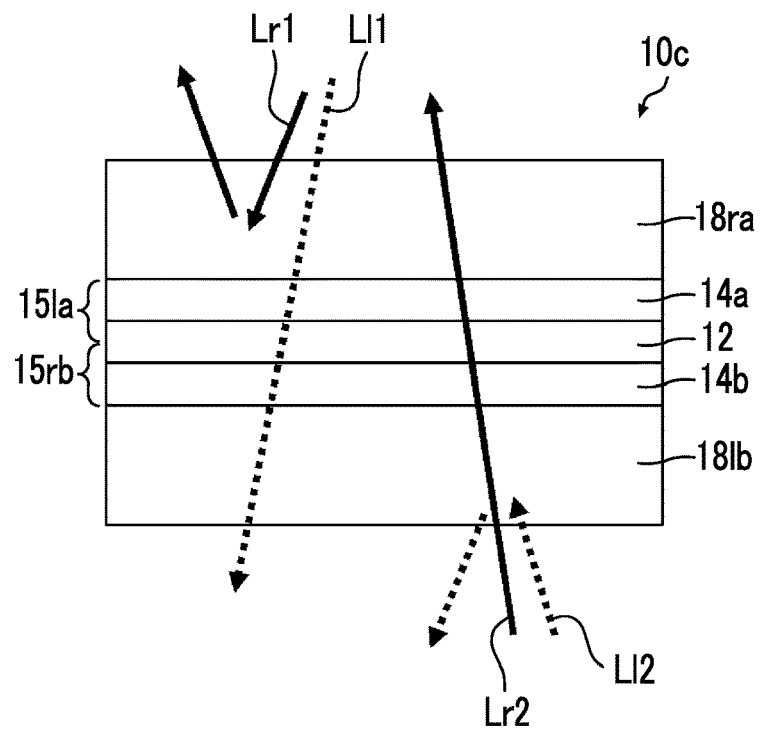
FIG. 7 is a schematic view for describing an operation of the transmission decorative film shown in FIG. 6.

As described above, in a case where the polarization direction of light reflected by the first cholesteric liquid crystalline layer 18la is different from the polarization direction of light reflected by the second cholesteric liquid crystalline layer 18lb, as shown in FIG. 7, the right circularly polarized light Lr1 at the selective reflection wavelength of the first cholesteric liquid crystalline layer 18ra (reflection region), among the light incident to the transmission decorative film 10c from the first cholesteric liquid crystalline layer 18ra side, is reflected by the first cholesteric liquid crystalline layer 18ra.

Meanwhile, the left circularly polarized light Ll1 among the light incident to the transmission decorative film 10c from the first cholesteric liquid crystalline layer 18ra side is transmitted through the first cholesteric liquid crystalline layer 18ra and is incident to the first λ/4 plate 14a. The left circularly polarized light Ll1 transmitted through the first cholesteric liquid crystalline layer 18ra is converted into linearly polarized light by the first λ/4 plate 14a and is incident to the linear polarization plate 12. The linear polarization plate 12 is disposed in accordance with the polarization axis so that the linearly polarized light converted by the first λ/4 plate 14a is transmitted, and accordingly, the linearly polarized light converted by the first λ/4 plate 14a is transmitted through the linear polarization plate 12. The linearly polarized light transmitted through the linear polarization plate 12 is incident to the second λ/4 plate 14b and is converted into right circularly polarized light. The right circularly polarized light converted by the second λ/4 plate 14b is transmitted through the second cholesteric liquid crystalline layer 18lb.

In the same manner, among the light incident to the transmission decorative film 10c from the second cholesteric liquid crystalline layer 18lb side, the left circularly polarized light Ll2 at the selective reflection wavelength of the second cholesteric liquid crystalline layer 18lb (reflection region) is reflected by the second cholesteric liquid crystalline layer 18lb.

Meanwhile, the right circularly polarized light Lr2 among the light incident to the transmission decorative film 10c from the second cholesteric liquid crystalline layer 18lb side is transmitted through the second cholesteric liquid crystalline layer 18lb and is incident to the second λ/4 plate 14b. The right circularly polarized light Lr2 transmitted through the second cholesteric liquid crystalline layer 18lb is converted into the linearly polarized light by the second λ/4 plate 14b and is incident to the linear polarization plate 12. The linear polarization plate 12 is disposed in accordance with the polarization axis so that the linearly polarized light converted by the second λ/4 plate 14b is transmitted, and accordingly, the linearly polarized light converted by the second λ/4 plate 14b is transmitted through the linear polarization plate 12. The linearly polarized light transmitted through the linear polarization plate 12 is incident to the first λ/4 plate 14a and is converted into the right circularly polarized light. The right circularly polarized light converted by the first λ/4 plate 14a is transmitted through the first cholesteric liquid crystalline layer 18ra.

As described above, even in a case where the polarization direction of light reflected by the first cholesteric liquid crystalline layer 18la is different from the polarization direction of light reflected by the second cholesteric liquid crystalline layer 18lb, the transmission decorative film 10c can have a pattern of an image seen from one surface side and a pattern of an image seen from the other surface side different from each other, while having transparency.

In the transmission decorative film 10a shown in FIG. 1, each of the first cholesteric liquid crystalline layer 18ra and the second cholesteric liquid crystalline layer 18rb is set as one layer, but there is no limitation thereto.

Figure 8:
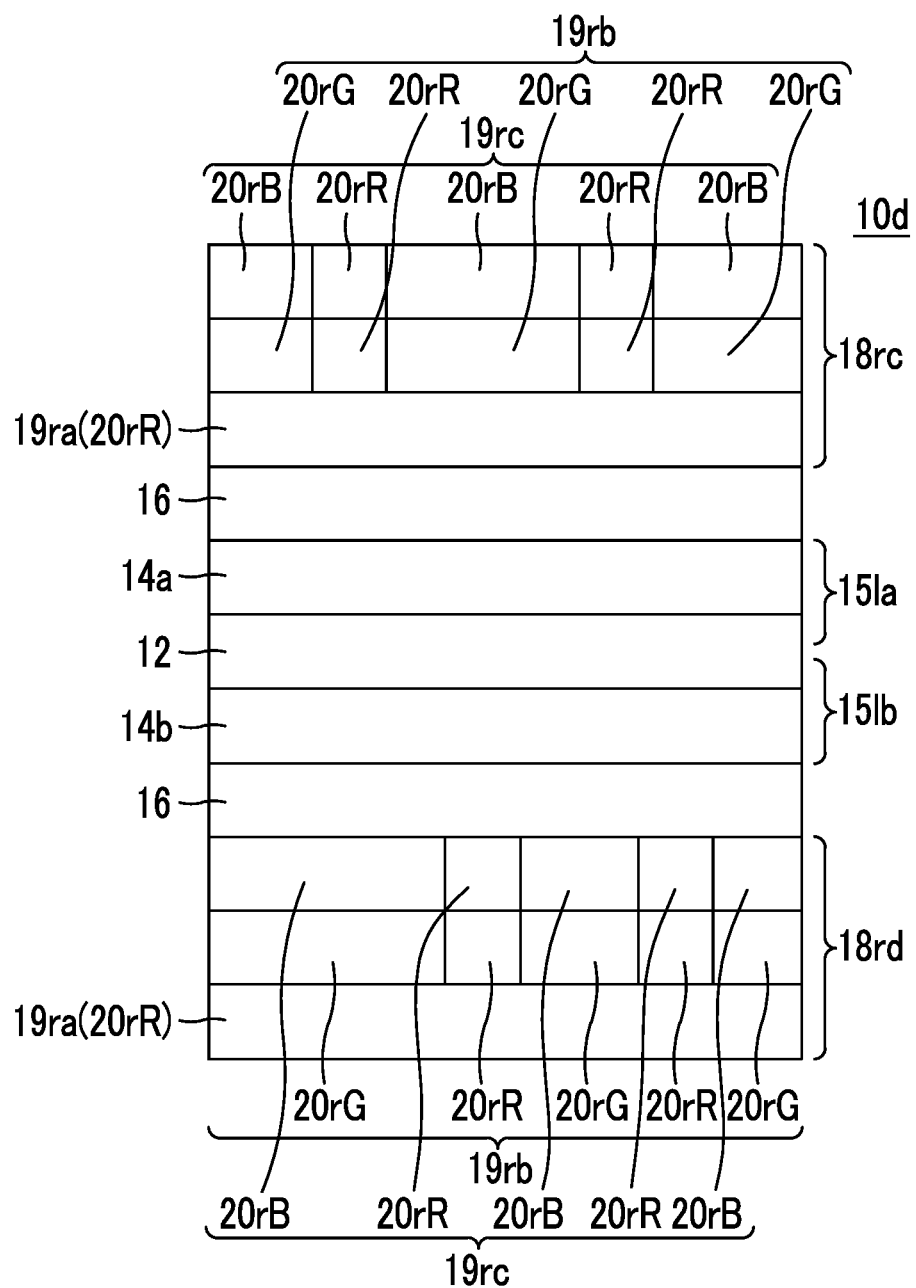
FIG. 8 is a cross section view schematically showing another example of the transmission decorative film of the present invention.

FIG. 8 shows another example of the transmission decorative film of the present invention.

A transmission decorative film 10d shown in FIG. 8 includes a first cholesteric liquid crystalline layer 18rc, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18rd in this order.

A combination of the first λ/4 plate 14a and the linear polarization plate 12 is disposed so as to function as the left circular polarization plate 151a and a combination of the second λ/4 plate 14b and the linear polarization plate 12 is disposed so as to function as the left circular polarization plate 151b.

The first cholesteric liquid crystalline layer 18re has a configuration in which three layers of a reflection layer 19ra formed of the red right circular polarization reflection region 20rR which reflects right circularly polarized red light and transmits left circularly polarized red light and light in other wavelength ranges, a reflection layer 19rb including the red right circular polarization reflection region 20rR and the green right circular polarization reflection region 20rG which reflects right circularly polarized green light and transmits left circularly polarized green light and light in other wavelength ranges, and a reflection layer 19re including the red right circular polarization reflection region 20rR and the blue right circular polarization reflection region 20rB which reflects right circularly polarized blue light and transmits left circularly polarized blue light and light in other wavelength ranges, are laminated from the pressure sensitive adhesive layer 16 side.

In addition, the second cholesteric liquid crystalline layer 18rd has a configuration in which three layers of the reflection layer 19re including the red right circular polarization reflection region 20rR and the blue right circular polarization reflection region 20rB, the reflection layer 19rb including the red right circular polarization reflection region 20rR and the green right circular polarization reflection region 20rG, and the reflection layer 19ra formed of the red right circular polarization reflection region 20rR are laminated from the pressure sensitive adhesive layer 16 side.

As described above, it is possible to visually recognize white light and a color at a wavelength other than the selective reflection wavelength, by causing the first cholesteric liquid crystalline layer and the second cholesteric liquid crystalline layer to have a configuration in which two or more reflection layers having different formation patterns of the reflection region are laminated and the reflection regions having different selective reflection wavelength are laminated in the same position in a plane direction.

In the example shown in FIG. 8, each reflection layer of the first cholesteric liquid crystalline layer 18rc and each reflection layer of the second cholesteric liquid crystalline layer 18rd reflect right circularly polarized light, but there is no limitation. Each reflection layer of the first cholesteric liquid crystalline layer and each reflection layer of the second cholesteric liquid crystalline layer may have a configuration of reflecting left circularly polarized light, as the transmission decorative film 10e shown in FIG. 9, or a configuration in which each reflection layer of one cholesteric liquid crystalline layer reflects right circularly polarized light, and each reflection layer of the other cholesteric liquid crystalline layer reflects left circularly polarized light may be used, as the transmission decorative film 10f shown in FIG. 10.

Figure 9:
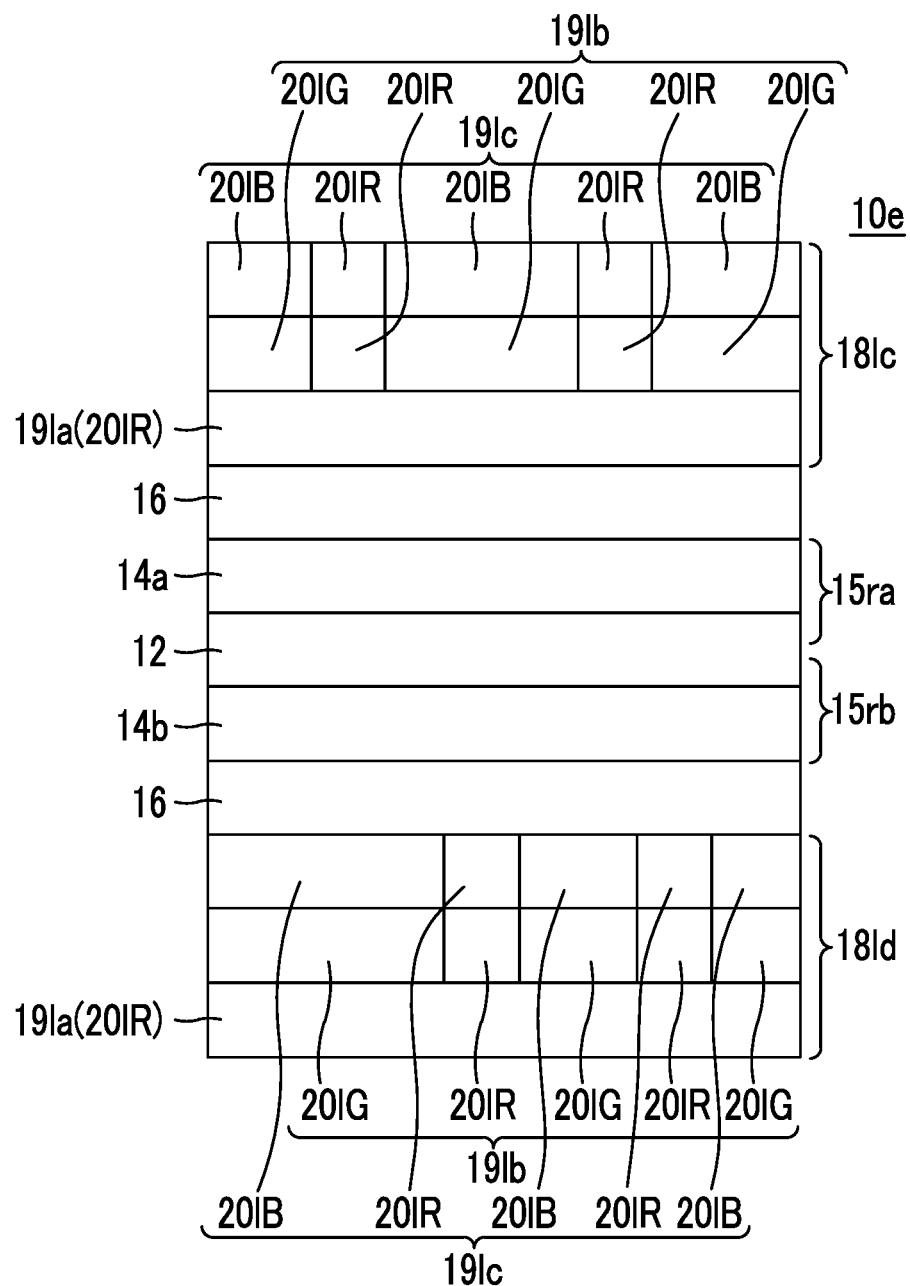
FIG. 9 is a cross section view schematically showing another example of the transmission decorative film of the present invention.

A transmission decorative film 10e shown in FIG. 9 includes a first cholesteric liquid crystalline layer 18lc, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18ld in this order.

A combination of the first λ/4 plate 14a and the linear polarization plate 12 is disposed so as to function as the right circular polarization plate 15ra and a combination of the second λ/4 plate 14b and the linear polarization plate 12 is disposed so as to function as the right circular polarization plate 15rb.

The first cholesteric liquid crystalline layer 18lc has a configuration in which three layers of a reflection layer 19la formed of the red left circular polarization reflection region 20lR which reflects left circularly polarized red light and transmits right circularly polarized red light and light in other wavelength ranges, a reflection layer 19lb including the red left circular polarization reflection region 20lR and the green left circular polarization reflection region 20lG which reflects left circularly polarized green light and transmits right circularly polarized green light and light in other wavelength ranges, and a reflection layer 19lc including the red left circular polarization reflection region 20lR and the blue left circular polarization reflection region 20lB which reflects left circularly polarized blue light and transmits right circularly polarized blue light and light in other wavelength ranges, are laminated from the pressure sensitive adhesive layer 16 side.

In addition, the second cholesteric liquid crystalline layer 18ld has a configuration in which three layers of the reflection layer 19lc including the red left circular polarization reflection region 20lR and the blue left circular polarization reflection region 20lB, the reflection layer 19lb including the red left circular polarization reflection region 20lR and the green left circular polarization reflection region 20lG, and the reflection layer 19la formed of the red left circular polarization reflection region 20lR are laminated from the pressure sensitive adhesive layer 16 side.

Figure 10:
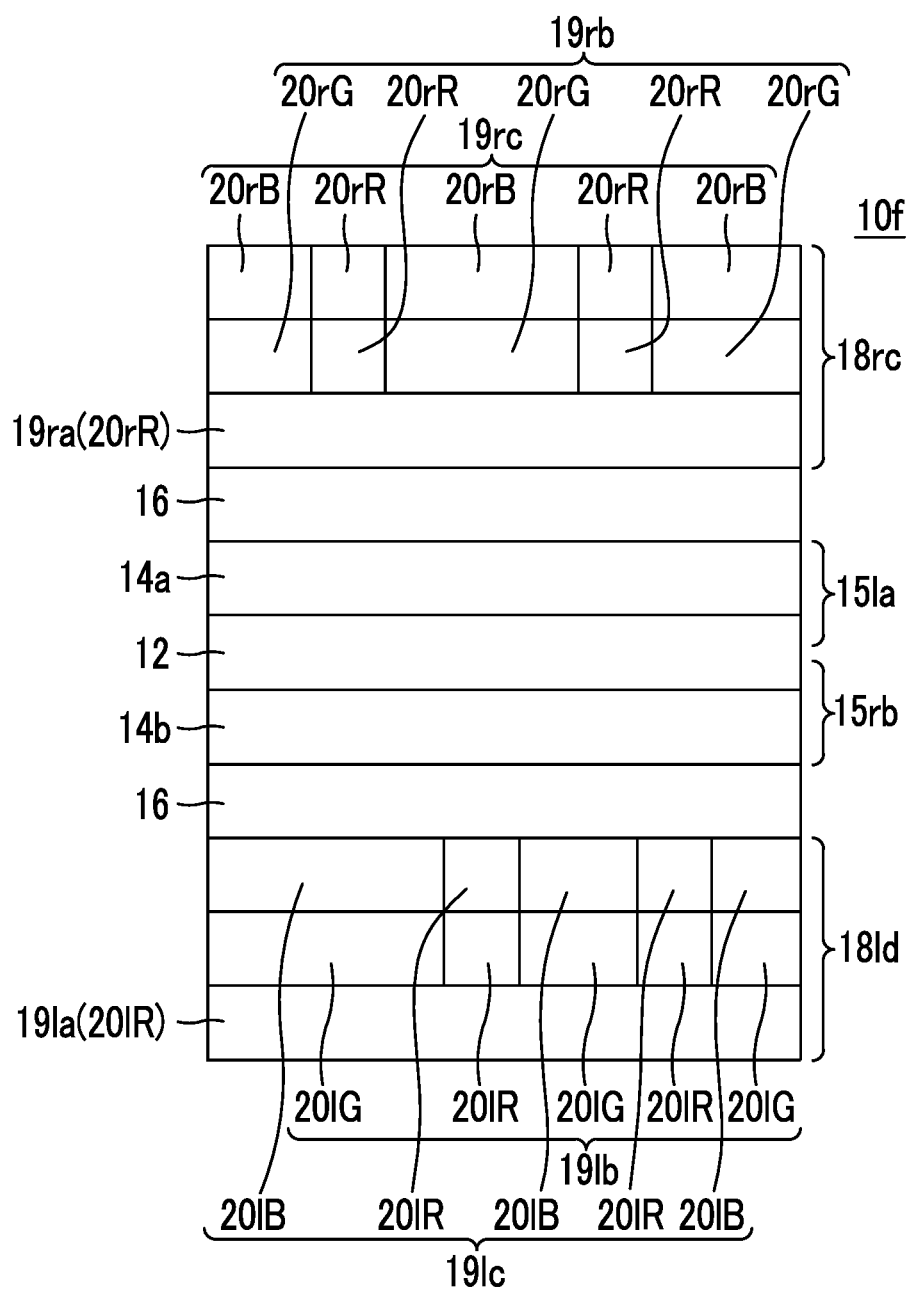
FIG. 10 is a cross section view schematically showing another example of the transmission decorative film of the present invention.

A transmission decorative film 10f shown in FIG. 10 includes the first cholesteric liquid crystalline layer 18rc, the pressure sensitive adhesive layer 16, the first λ/4 plate 14a, the linear polarization plate 12, the second λ/4 plate 14b, the pressure sensitive adhesive layer 16, and the second cholesteric liquid crystalline layer 18ld in this order.

A combination of the first λ/4 plate 14a and the linear polarization plate 12 is disposed so as to function as the left circular polarization plate 151a and a combination of the second λ/4 plate 14b and the linear polarization plate 12 is disposed so as to function as the right circular polarization plate 15rb.

The first cholesteric liquid crystalline layer 18rc has a configuration in which three layers of the reflection layer 19ra formed of the red right circular polarization reflection region 20rR, the reflection layer 19rb including the red right circular polarization reflection region 20rR and the green right circular polarization reflection region 20rG, and the reflection layer 19rc including the red right circular polarization reflection region 20rR and the blue right circular polarization reflection region 20rB are laminated from the pressure sensitive adhesive layer 16 side.

In addition, the second cholesteric liquid crystalline layer 18ld has a configuration in which three layers of the reflection layer 19lc including the red left circular polarization reflection region 20lR and the blue left circular polarization reflection region 20lB, the reflection layer 19lb including the red left circular polarization reflection region 20lR and the green left circular polarization reflection region 20lG, and the reflection layer 19la formed of the red left circular polarization reflection region 20lR are laminated from the pressure sensitive adhesive layer 16 side.

In addition, in the examples shown in FIGS. 8 to 10, the reflection layer of the cholesteric liquid crystalline layer has a configuration of including at least one of the reflection region where the wavelength of red light (light in a wavelength range of 620 nm to 750 nm) is the selective reflection wavelength, the reflection region where the wavelength of green light (light in a wavelength range of 495 nm to 570 nm) is the selective reflection wavelength, and the reflection region where the wavelength of blue light (light in a wavelength range of 420 nm to 490 nm) is the selective reflection wavelength, but there is no limitation thereto, and a reflection region in which the other wavelength range is the selective reflection wavelength may be included.

Figure 11:
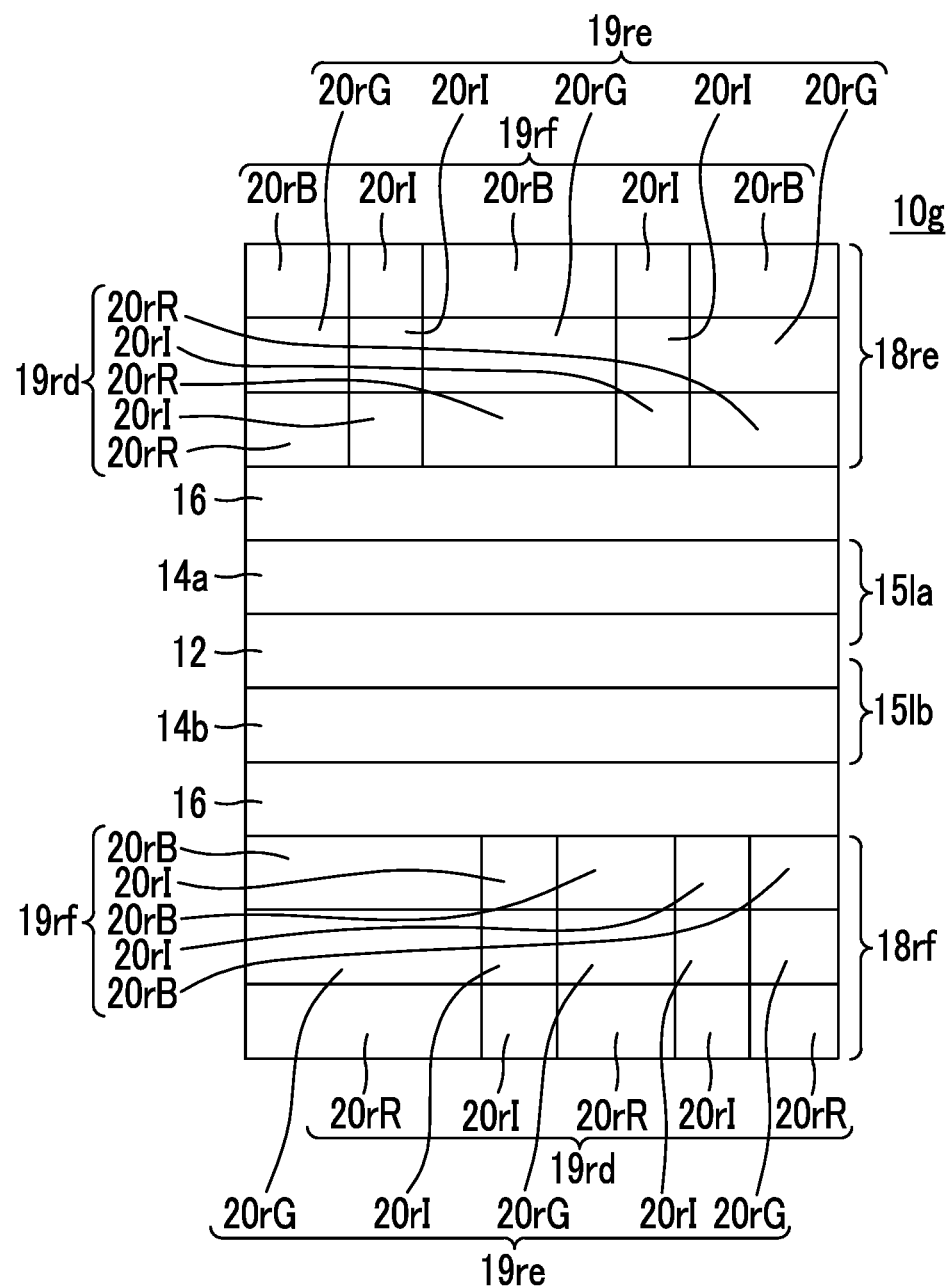
FIG. 11 is a cross section view schematically showing another example of the transmission decorative film of the present invention.

As an example, as shown in FIG. 11, a reflection region in which a wavelength of infrared light is the selective reflection wavelength may be included. Infrared light is light in a wavelength range exceeding 780 nm and equal to or less than 1 mm, and among these, the near infrared region is light in a wavelength range exceeding 780 nm and equal to or less than 2000 nm.

A transmission decorative film 10g shown in FIG. 11 includes a first cholesteric liquid crystalline layer 18re, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18rf in this order.

A combination of the first λ/4 plate 14a and the linear polarization plate 12 is disposed so as to function as the left circular polarization plate 151a and a combination of the second λ/4 plate 14b and the linear polarization plate 12 is disposed so as to function as the second left circular polarization plate 151b.

The first cholesteric liquid crystalline layer 18re has a configuration in which three layers of a reflection layer 19rd including the red right circular polarization reflection region 20rR and an infrared right circular polarization reflection region 20rI which reflects right circularly polarized infrared light and transmits left circularly polarized infrared light and light in other wavelength ranges, a reflection layer 19re including the infrared right circular polarization reflection region 20rI and the green right circular polarization reflection region 20rG, and a reflection layer 19rf including the infrared right circular polarization reflection region 20rI and the blue right circular polarization reflection region 20rB are laminated from the pressure sensitive adhesive layer 16 side.

In addition, the second cholesteric liquid crystalline layer 18rf has a configuration in which three layers of the reflection layer 19rf including the infrared right circular polarization reflection region 20rI and the blue right circular polarization reflection region 20rB, the reflection layer 19re including the infrared right circular polarization reflection region 20rI and the green right circular polarization reflection region 20rG, and the reflection layer 19rd including the red right circular polarization reflection region 20rR and the infrared right circular polarization reflection region 20rI are laminated from the pressure sensitive adhesive layer 16 side.

The reflection region in which the wavelength of infrared light is the selective reflection wavelength transmits visible light, and accordingly, this part is visually recognized as a transparent part.

In the example shown in FIG. 1, both of the first cholesteric liquid crystalline layer 18ra and the second cholesteric liquid crystalline layer 18rb are configured to include two or more reflection regions having different selective reflection wavelengths, but there is no limitation thereto, and at least one of the first cholesteric liquid crystalline layer 18ra and the second cholesteric liquid crystalline layer 18rb may be configured to include two or more reflection regions having different selective reflection wavelengths.

In the example shown in FIG. 1, the transmission decorative film 10a is configured to have the pattern seen from one surface side and the pattern seen from the other surface side different from each other, by configuring the first cholesteric liquid crystalline layer 18ra and the second cholesteric liquid crystalline layer 18rb to be entirely formed on the λ/4 plate and respectively making the formation pattern of the reflection region of the first cholesteric liquid crystalline layer 18ra and the second cholesteric liquid crystalline layer 18rb to be different from each other, but there is no limitation thereto, and a configuration of applying a pattern to the transmission decorative film by configuring the cholesteric liquid crystalline layer to be formed on a part of the λ/4 plate may be used.

Figure 12:
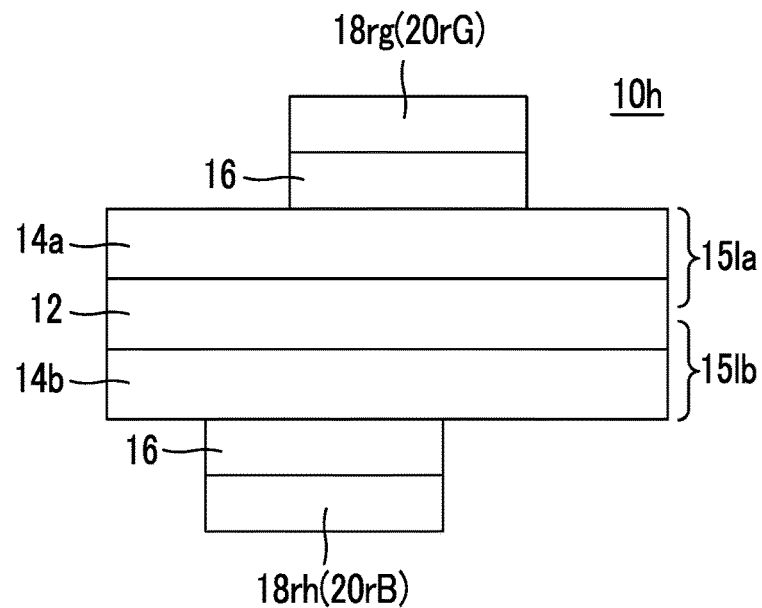
FIG. 12 is a cross section view schematically showing another example of the transmission decorative film of the present invention.

As an example, a transmission decorative film 10h shown in FIG. 12 includes a first cholesteric liquid crystalline layer 18rg, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18rh in this order.

As shown in the drawing, the first cholesteric liquid crystalline layer 18rg is formed of green right circular polarization reflection region 20rG and is laminated on a part of the first λ/4 plate 14a through the pressure sensitive adhesive layer 16.

In addition, the second cholesteric liquid crystalline layer 18rh is formed of the blue right circular polarization reflection region 20rB and is laminated on a part of the second λ/4 plate 14b through the pressure sensitive adhesive layer 16.

Each of the first cholesteric liquid crystalline layer 18rg and the second cholesteric liquid crystalline layer 18rh is formed in a desired shape in accordance with an image to be displayed.

Figure 13:
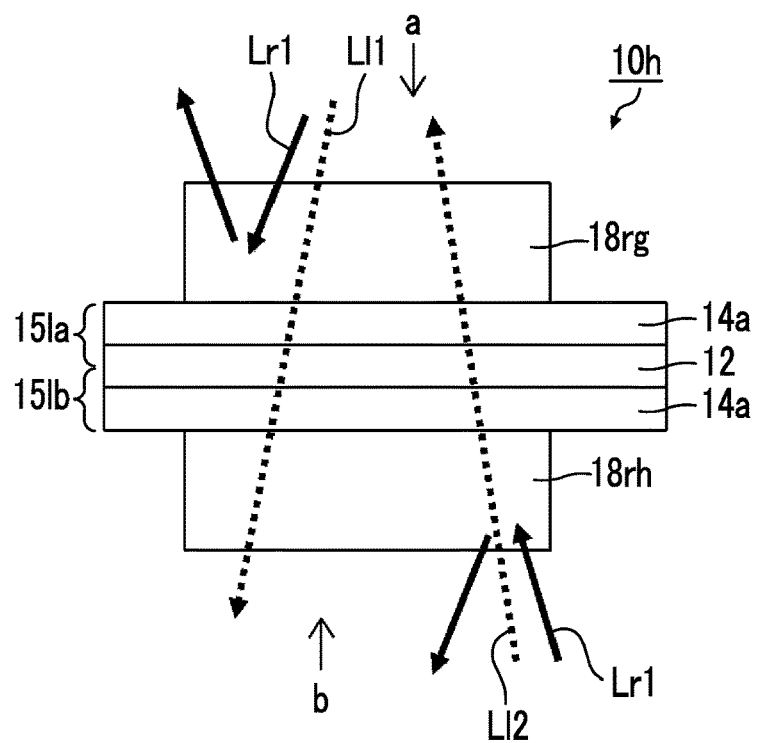
FIG. 13 is a schematic view for describing an operation of the transmission decorative film shown in FIG. 12.

Next, the operation of the transmission decorative film 10h configured as described above will be described with reference to FIGS. 13 to 15. In FIG. 13, the pressure sensitive adhesive layer 16 is omitted.

As shown in FIG. 13, in the region where the first cholesteric liquid crystalline layer 18rg is formed, among the light incident to the transmission decorative film 10h from the first cholesteric liquid crystalline layer 18rg side, the right circularly polarized light Lr1 at the selective reflection wavelength of the first cholesteric liquid crystalline layer 18rg (reflection region) is reflected by the first cholesteric liquid crystalline layer 18rg.

Meanwhile, the left circularly polarized light Ll1 among the light incident to the transmission decorative film 10a from the first cholesteric liquid crystalline layer 18rg is transmitted through the first cholesteric liquid crystalline layer 18rg and is incident to the first λ/4 plate 14a. The left circularly polarized light Ll1 transmitted through the first cholesteric liquid crystalline layer 18rg is converted into linearly polarized light by the first λ/4 plate 14a and is incident to the linear polarization plate 12. The linear polarization plate 12 is disposed in accordance with the polarization axis so that the linearly polarized light converted by the first λ/4 plate 14a is transmitted, and accordingly, the linearly polarized light converted by the first λ/4 plate 14a is transmitted through the linear polarization plate 12. The linearly polarized light transmitted through the linear polarization plate 12 is incident to the second λ/4 plate 14b and is converted into left circularly polarized light. The left circularly polarized light converted by the second λ/4 plate 14b is transmitted through the second cholesteric liquid crystalline layer 18rh.

In the region where the first cholesteric liquid crystalline layer 18rg is not formed, non-polarized light is transmitted through the first λ/4 plate 14a and is incident to the linear polarization plate 12. The light incident to the linear polarization plate 12 is converted into linearly polarized light and is incident to the second λ/4 plate 14b. The light incident to the second λ/4 plate 14b is converted into left circularly polarized light and transmitted.

In the same manner, in the region where the second cholesteric liquid crystalline layer 18rh is formed, among the light incident to the transmission decorative film 10h from the second cholesteric liquid crystalline layer 18rh side, the right circularly polarized light Lr2 at the selective reflection wavelength of the second cholesteric liquid crystalline layer 18rh (reflection region) is reflected by the second cholesteric liquid crystalline layer 18rh.

Meanwhile, among the light incident to the transmission decorative film 10h from the second cholesteric liquid crystalline layer 18rh side, the left circularly polarized light Ll2 is transmitted through the second cholesteric liquid crystalline layer 18rh and is incident to the second λ/4 plate 14b. The left circularly polarized light Ll2 transmitted through the second cholesteric liquid crystalline layer 18rh is converted into linearly polarized light by the second λ/4 plate 14b and is incident to the linear polarization plate 12. The linear polarization plate 12 is disposed in accordance with the polarization axis so that the linearly polarized light converted by the second λ/4 plate 14b is transmitted, and accordingly, the linearly polarized light converted by the second λ/4 plate 14b is transmitted through the linear polarization plate 12. The linearly polarized light transmitted through the linear polarization plate 12 is incident to the first λ/4 plate 14a and is converted into left circularly polarized light. The left circularly polarized light converted by the first λ/4 plate 14a is transmitted through the first cholesteric liquid crystalline layer 18rg.

In addition, in the region where the second cholesteric liquid crystalline layer 18rh is not formed, non-polarized light is transmitted through the second λ/4 plate 14b and is incident to the linear polarization plate 12. The light incident to the linear polarization plate 12 is converted into linearly polarized light and is incident to the first λ/4 plate 14a. The light incident to the first λ/4 plate 14a is converted into left circularly polarized light and transmitted.

Accordingly, in a case where the transmission decorative film 10h is observed from the first cholesteric liquid crystalline layer 18rg side (in FIG. 13, in a view of the a direction), the scene of the other side of the transmission decorative film 10h (second cholesteric liquid crystalline layer 18rh side) is visually recognized by the left circularly polarized light transmitted and incident from the second cholesteric liquid crystalline layer 18rh side and the left circularly polarized light transmitted through the region where the first cholesteric liquid crystalline layer 18rg is not formed, and the light at the selective reflection wavelength of the reflection region of the first cholesteric liquid crystalline layer 18rg is visually recognized in the region where the first cholesteric liquid crystalline layer 18rg is formed.

Figure 14:
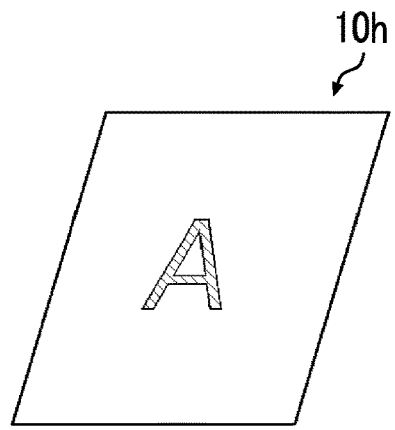
FIG. 14 is a view showing FIG. 13 in an a direction.

That is, in a view in the a direction in FIG. 13, an image of a pattern according to the shape of the reflection region of the first cholesteric liquid crystalline layer 18rg is visually recognized without the effect to the shape of the second cholesteric liquid crystalline layer 18rh (FIG. 14).

In the same manner, in a case where the transmission decorative film 10h is observed from the second cholesteric liquid crystalline layer 18rh side (in FIG. 13, in a view of the b direction), the scene of the other side of the transmission decorative film 10h (first cholesteric liquid crystalline layer 18rg side) is visually recognized by the left circularly polarized light transmitted and incident from the first cholesteric liquid crystalline layer 18rg side and the left circularly polarized light transmitted through the region where the second cholesteric liquid crystalline layer 18rh is not formed, and the light at the selective reflection wavelength of the reflection region of the second cholesteric liquid crystalline layer 18rh is visually recognized in the region where the second cholesteric liquid crystalline layer 18rh is formed.

Figure 15:
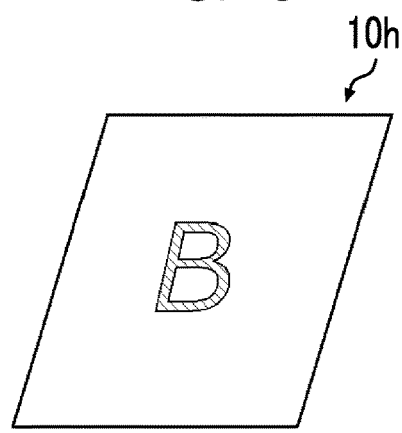
FIG. 15 is a view showing FIG. 13 in a b direction.

That is, in a view in the b direction in FIG. 13, an image of a pattern according to the shape of the reflection region of the second cholesteric liquid crystalline layer 18rh is visually recognized without the effect to the shape of the first cholesteric liquid crystalline layer 18rg (FIG. 15).

Therefore, the transmission decorative film 10h can have a pattern of an image seen from one surface side (a direction) and a pattern of an image seen from the other surface side (b direction) different from each other, while having transparency.

Here, in the example shown in FIG. 12, the first cholesteric liquid crystalline layer 18rg and the second cholesteric liquid crystalline layer 18rh are respectively configured to reflect right circularly polarized light, and there is no limitation thereto.

Figure 16:
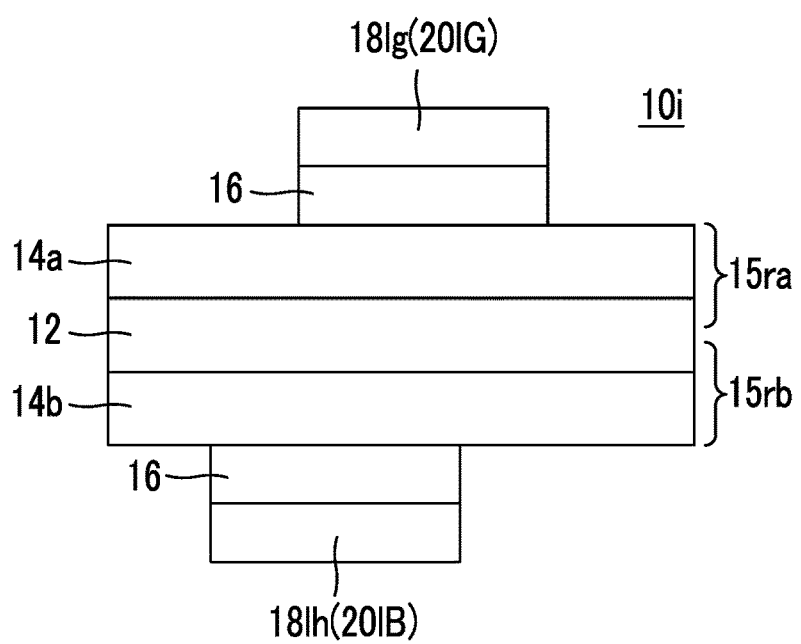
FIG. 16 is a cross section view schematically showing another example of the transmission decorative film of the present invention.

A transmission decorative film 10i shown in FIG. 16 includes a first cholesteric liquid crystalline layer 18lg, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18lh in this order.

As shown in the drawing, the first cholesteric liquid crystalline layer 18lg is formed of green left circular polarization reflection region 20lG and is laminated on a part of the first λ/4 plate 14a through the pressure sensitive adhesive layer 16.

In addition, the second cholesteric liquid crystalline layer 18lh is formed of the blue left circular polarization reflection region 20lB and is laminated on a part of the second λ/4 plate 14b through the pressure sensitive adhesive layer 16.

Each of the first cholesteric liquid crystalline layer 18lg and the second cholesteric liquid crystalline layer 18lh is formed in a desired shape in accordance with an image to be displayed.

In the transmission decorative film 10i, a combination of the linear polarization plate 12 and the first λ/4 plate 14a is disposed in accordance with the slow axis and the polarization axis, so as to function as a right circular polarization plate (in FIG. 16, first right circular polarization plate 15ra) which transmits right circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a right circular polarization plate (in FIG. 16, second right circular polarization plate 15rb) which transmits right circularly polarized light as linearly polarized light among the light incident from the second λ/4 plate 14b side.

As described above, also, in a case where the first cholesteric liquid crystalline layer 18lg and the second cholesteric liquid crystalline layer 18lh are configured to reflect left circularly polarized light at the selective reflection wavelength, respectively, the transmission decorative film 10i can have a pattern of an image seen from one surface side and a pattern of an image seen from the other surface side different from each other, while having transparency.

Figure 17:
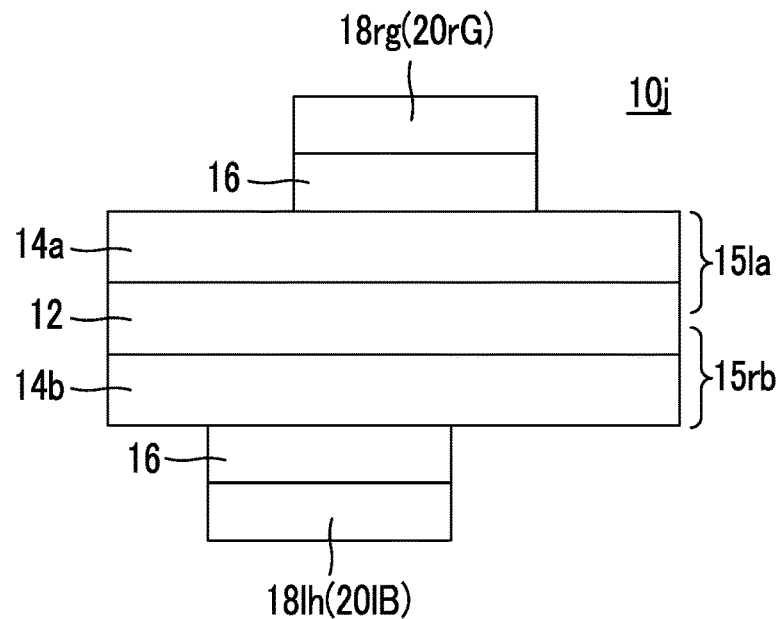
FIG. 17 is a cross section view schematically showing another example of the transmission decorative film of the present invention.

In addition, a transmission decorative film 10j shown in FIG. 17 includes the first cholesteric liquid crystalline layer 18rg, the pressure sensitive adhesive layer 16, the first λ/4 plate 14a, the linear polarization plate 12, the second λ/4 plate 14b, the pressure sensitive adhesive layer 16, and the second cholesteric liquid crystalline layer 18lh in this order.

As shown in the drawing, the first cholesteric liquid crystalline layer 18rg is formed of green right circular polarization reflection region 20rG and is laminated on a part of the first λ/4 plate 14a through the pressure sensitive adhesive layer 16.

In addition, the second cholesteric liquid crystalline layer 18lh is formed of the blue left circular polarization reflection region 20lB and is laminated on a part of the second λ/4 plate 14b through the pressure sensitive adhesive layer 16.

Each of the first cholesteric liquid crystalline layer 18rg and the second cholesteric liquid crystalline layer 18lh is formed in a desired shape in accordance with an image to be displayed.

In the transmission decorative film 10j, a combination of the linear polarization plate 12 and the first λ/4 plate 14a is disposed in accordance with the slow axis and the polarization axis, so as to function as a left circular polarization plate (in FIG. 17, first left circular polarization plate 15la) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a right circular polarization plate (in FIG. 17, second right circular polarization plate 15rb) which transmits right circularly polarized light as linearly polarized light among the light incident from the second λ/4 plate 14b side.

As described above, even in a case where the polarization direction of light reflected by the first cholesteric liquid crystalline layer 18rg is different from the polarization direction of light reflected by the second cholesteric liquid crystalline layer 18lh, the transmission decorative film 10j can have a pattern of an image seen from one surface side and a pattern of an image seen from the other surface side different from each other, while having transparency.

In the transmission decorative film 10h shown in FIG. 12, each of the first cholesteric liquid crystalline layer 18rg and the second cholesteric liquid crystalline layer 18rh is set as one layer, but there is no limitation thereto.

Figure 18:
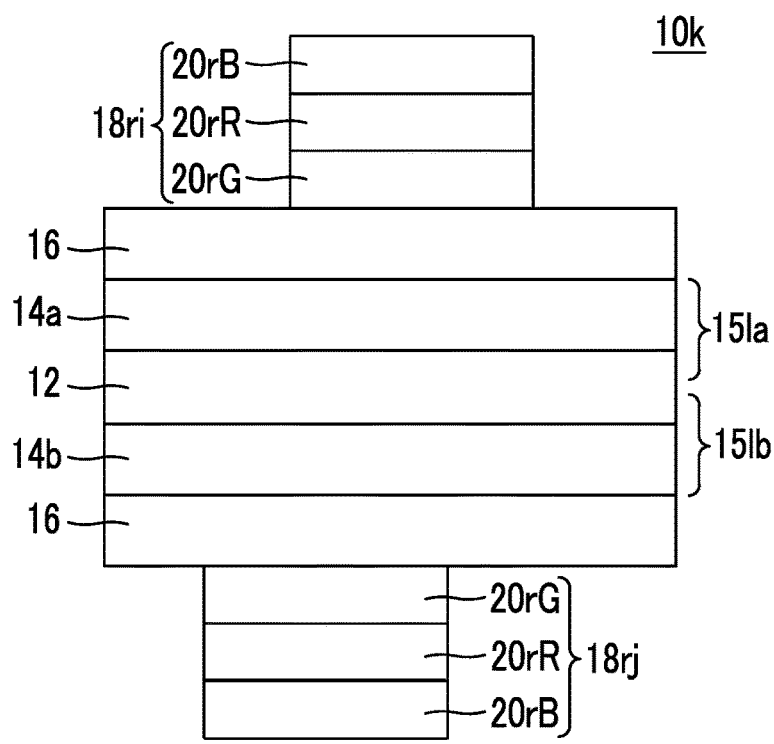
FIG. 18 is a cross section view schematically showing another example of the transmission decorative film of the present invention.

FIG. 18 shows another example of the transmission decorative film of the present invention.

A transmission decorative film 10k shown in FIG. 18 includes a first cholesteric liquid crystalline layer 18ri, the pressure sensitive adhesive layer 16, the first λ/4 plate 14a, the linear polarization plate 12, the second λ/4 plate 14b, the pressure sensitive adhesive layer 16, and a second cholesteric liquid crystalline layer 18rj in this order.

A combination of the first λ/4 plate 14a and the linear polarization plate 12 is disposed so as to function as the left circular polarization plate 15la and a combination of the second λ/4 plate 14b and the linear polarization plate 12 is disposed so as to function as the left circular polarization plate 15lb.

The first cholesteric liquid crystalline layer 18ri has a configuration in which three layers of the green right circular polarization reflection region 20rG, the red right circular polarization reflection region 20rR, and the blue right circular polarization reflection region 20rB are laminated from the pressure sensitive adhesive layer 16 side.

In addition, the second cholesteric liquid crystalline layer 18rj has a configuration in which three layers of the green right circular polarization reflection region 20rG, the red right circular polarization reflection region 20rR, and the blue right circular polarization reflection region 20rB are laminated from the pressure sensitive adhesive layer 16 side.

As described above, it is possible to visually recognize white light and a color at a wavelength other than the selective reflection wavelength, by causing the first cholesteric liquid crystalline layer and the second cholesteric liquid crystalline layer to have a configuration in which two or more layers of the reflection regions having different selective reflection wavelength are laminated.

In the example shown in FIG. 12, the cholesteric liquid crystalline layer is configured to be laminated on the λ/4 plate through the pressure sensitive adhesive layer, but there is no limitation thereto, and the cholesteric liquid crystalline layer may be configured to be formed on a surface layer film laminated on the λ/4 plate.

Figure 19:
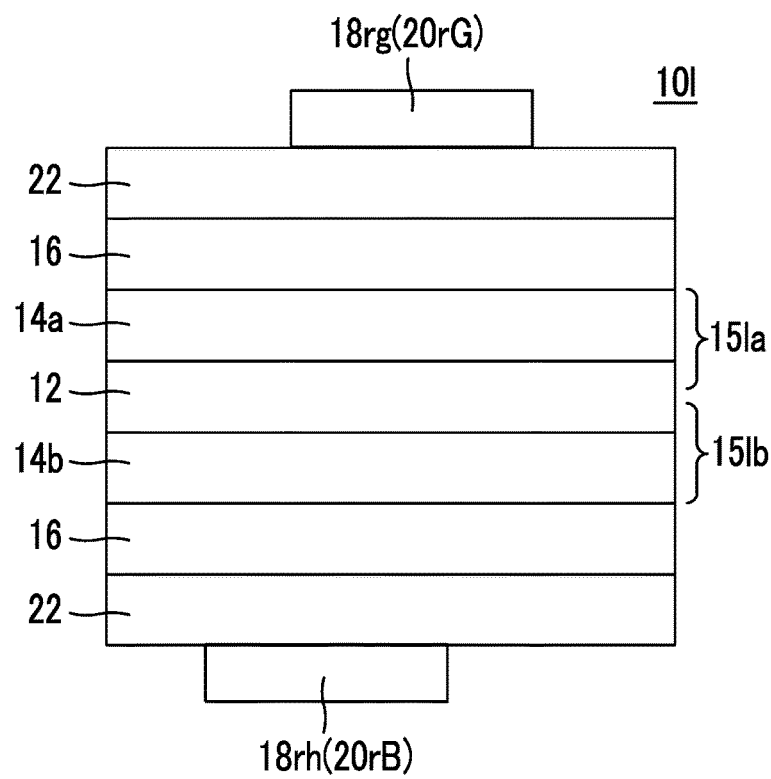
FIG. 19 is a cross section view schematically showing another example of the transmission decorative film of the present invention.
Figure 20:
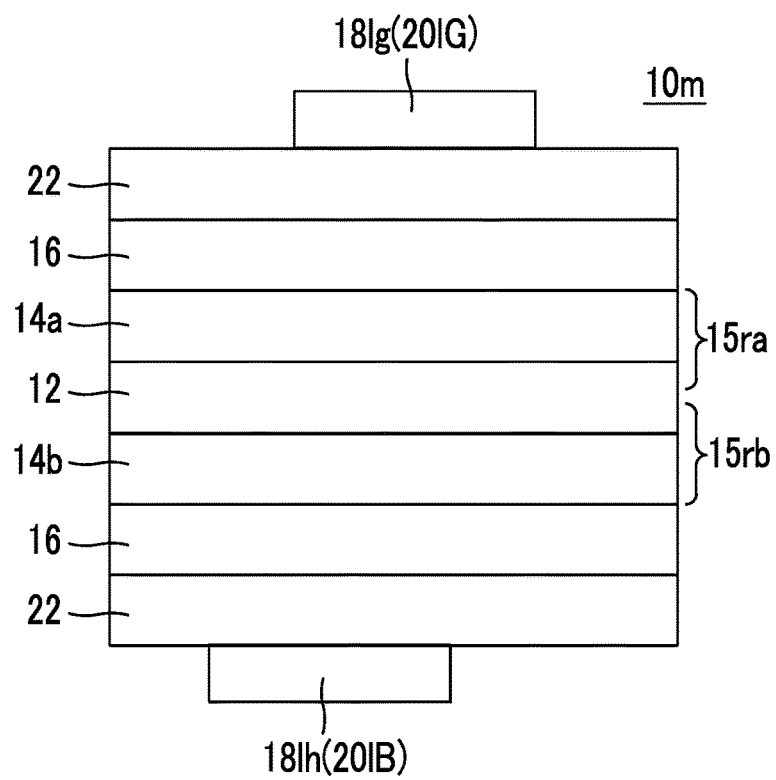
FIG. 20 is a cross section view schematically showing another example of the transmission decorative film of the present invention.
Figure 21:
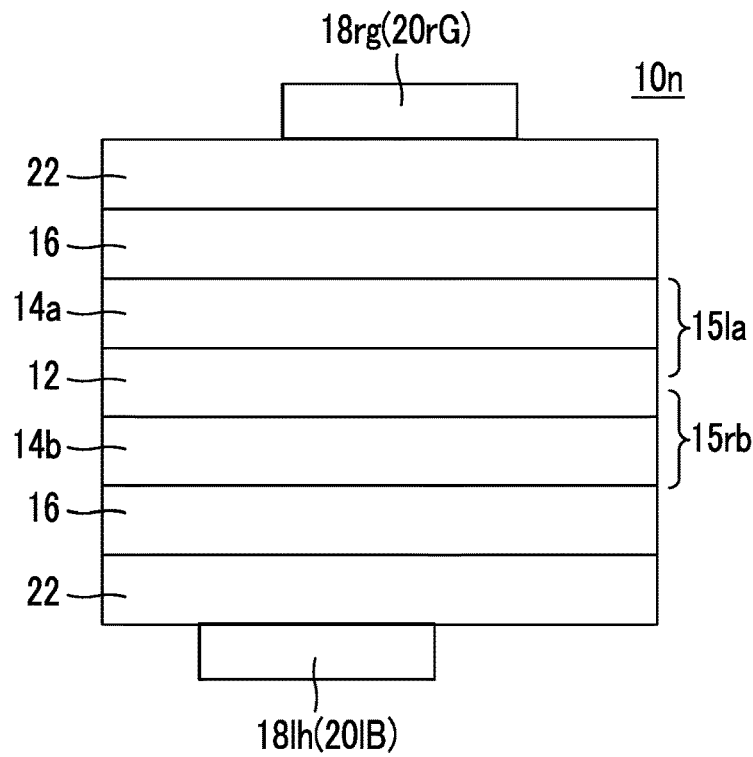
FIG. 21 is a cross section view schematically showing another example of the transmission decorative film of the present invention.

FIGS. 19 to 21 show another example of the transmission decorative film of the present invention.

A transmission decorative film 10l shown in FIG. 19 includes the first cholesteric liquid crystalline layer 18rg, a surface layer film 22, the pressure sensitive adhesive layer 16, the first λ/4 plate 14a, the linear polarization plate 12, the second λ/4 plate 14b, the pressure sensitive adhesive layer 16, the surface layer film 22, and the second cholesteric liquid crystalline layer 18rh in this order.

As shown in the drawing, the first cholesteric liquid crystalline layer 18rg is formed of green right circular polarization reflection region 20rG and is laminated on a part of the surface layer film 22 laminated on the first λ/4 plate 14a.

In addition, the second cholesteric liquid crystalline layer 18rh is formed of the blue right circular polarization reflection region 20rB and is laminated on a part of the surface layer film 22 laminated on the second λ/4 plate 14b.

In the transmission decorative film 10l, a combination of the linear polarization plate 12 and the first λ/4 plate 14a is disposed in accordance with the slow axis and the polarization axis, so as to function as a left circular polarization plate (in FIG. 19, first left circular polarization plate 151a) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a left circular polarization plate (in FIG. 19, second left circular polarization plate 151b) which transmits left circularly polarized light as linearly polarized light, among the light incident from the second λ/4 plate 14b side.

Here, examples of the surface layer film 22 include a polyethylene terephthalate (PET) film, a cellulose triacetate (TAC) film, and an acrylate-based hard coated material, and particularly, a film having a retardation (Re) close to 0 is preferably used. Specifically, a TAC film, a resin film such as an acrylic film, or a glass film can be used, and among these, the TAC film is suitable.

A transmission decorative film 10m shown in FIG. 20 includes the first cholesteric liquid crystalline layer 18lg, the surface layer film 22, the pressure sensitive adhesive layer 16, the first λ/4 plate 14a, the linear polarization plate 12, the second λ/4 plate 14b, the pressure sensitive adhesive layer 16, the surface layer film 22, and the second cholesteric liquid crystalline layer 18lh in this order.

As shown in the drawing, the first cholesteric liquid crystalline layer 18lg is formed of green left circular polarization reflection region 20lG and is laminated on a part of the surface layer film 22 laminated on the first λ/4 plate 14a.

In addition, the second cholesteric liquid crystalline layer 18lh is formed of the blue left circular polarization reflection region 20lB and is laminated on a part of the surface layer film 22 laminated on the second λ/4 plate 14b.

In the transmission decorative film 10m, a combination of the linear polarization plate 12 and the first λ/4 plate 14a is disposed in accordance with the slow axis and the polarization axis, so as to function as a right circular polarization plate (in FIG. 20, first right circular polarization plate 15ra) which transmits right circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a right circular polarization plate (in FIG. 20, second right circular polarization plate 15rb) which transmits right circularly polarized light as linearly polarized light among the light incident from the second λ/4 plate 14b side.

A transmission decorative film 10n shown in FIG. 21 includes the first cholesteric liquid crystalline layer 18rg, the surface layer film 22, the pressure sensitive adhesive layer 16, the first λ/4 plate 14a, the linear polarization plate 12, the second λ/4 plate 14b, the pressure sensitive adhesive layer 16, the surface layer film 22, and the second cholesteric liquid crystalline layer 18lh in this order.

As shown in the drawing, the first cholesteric liquid crystalline layer 18rg is formed of green right circular polarization reflection region 20rG and is laminated on a part of the surface layer film 22 laminated on the first λ/4 plate 14a.

In addition, the second cholesteric liquid crystalline layer 18lh is formed of the blue left circular polarization reflection region 20lB and is laminated on a part of the surface layer film 22 laminated on the second λ/4 plate 14b.

In the transmission decorative film 10n, a combination of the linear polarization plate 12 and the first λ/4 plate 14a is disposed in accordance with the slow axis and the polarization axis, so as to function as a left circular polarization plate (in FIG. 21, first left circular polarization plate 151a) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a right circular polarization plate (in FIG. 21, second right circular polarization plate 15rb) which transmits right circularly polarized light as linearly polarized light among the light incident from the second λ/4 plate 14b side.

As shown in FIGS. 19 to 21, also, in a case where the cholesteric liquid crystalline layer is configured to be laminated on the surface layer film laminated on the λ/4 plate, the transmission decorative film can have a pattern of an image seen from one surface side and a pattern of an image seen from the other surface side different from each other, while having transparency.

Figure 22:
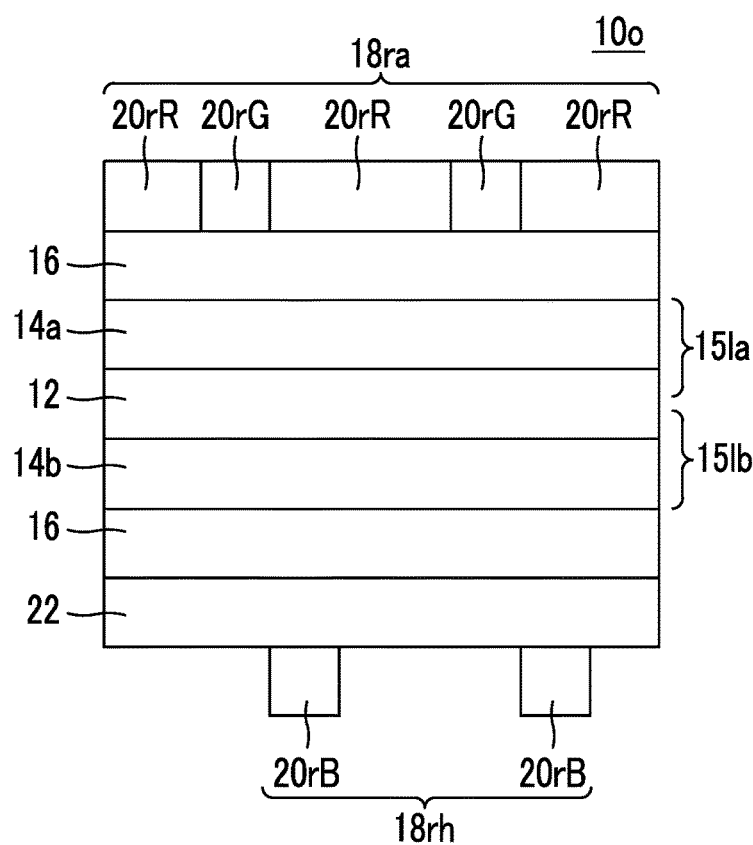
FIG. 22 is a cross section view schematically showing another example of the transmission decorative film of the present invention.
Figure 23:
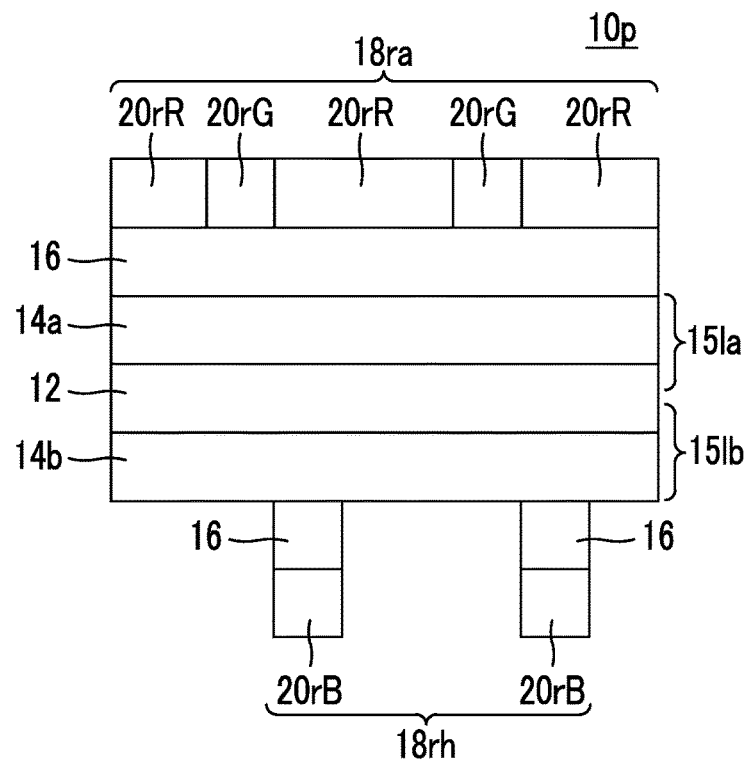
FIG. 23 is a cross section view schematically showing another example of the transmission decorative film of the present invention.

As in a transmission decorative film 10o shown in FIG. 22 and a transmission decorative film 10p shown in FIG. 23, one cholesteric liquid crystalline layer may be a layer including two or more reflection regions having different selective reflection wavelength and the other cholesteric liquid crystalline layer may be configured to be formed on a part of λ/4 plate.

The transmission decorative film 10o shown in FIG. 22 includes the first cholesteric liquid crystalline layer 18ra, the pressure sensitive adhesive layer 16, the first λ/4 plate 14a, the linear polarization plate 12, the second λ/4 plate 14b, the pressure sensitive adhesive layer 16, the surface layer film 22, and the second cholesteric liquid crystalline layer 18rh in this order.

As shown in the drawing, in the first cholesteric liquid crystalline layer 18ra, the red right circular polarization reflection region 20rR and the green right circular polarization reflection region 20rG are formed in a desired pattern.

In addition, the second cholesteric liquid crystalline layer 18rh is formed of the blue right circular polarization reflection region 20rB and is laminated on a part of the surface layer film 22.

In the transmission decorative film 10o, a combination of the linear polarization plate 12 and the first λ/4 plate 14a is disposed in accordance with the slow axis and the polarization axis, so as to function as a left circular polarization plate (in FIG. 22, first left circular polarization plate 151a) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a left circular polarization plate (in FIG. 22, second left circular polarization plate 151b) which transmits left circularly polarized light as linearly polarized light, among the light incident from the second λ/4 plate 14b side.

The transmission decorative film 10p shown in FIG. 23 includes the first cholesteric liquid crystalline layer 18ra, the pressure sensitive adhesive layer 16, the first λ/4 plate 14a, the linear polarization plate 12, the second λ/4 plate 14b, the pressure sensitive adhesive layer 16, and the second cholesteric liquid crystalline layer 18rh in this order.

As shown in the drawing, in the first cholesteric liquid crystalline layer 18ra, the red right circular polarization reflection region 20rR and the green right circular polarization reflection region 20rG are formed in a desired pattern.

In addition, the second cholesteric liquid crystalline layer 18rh is formed of the blue right circular polarization reflection region 20rB and is laminated on a part of the second λ/4 plate 14b through the pressure sensitive adhesive layer 16.

In the transmission decorative film 10p, a combination of the linear polarization plate 12 and the first λ/4 plate 14a is disposed in accordance with the slow axis and the polarization axis, so as to function as a left circular polarization plate (in FIG. 23, first left circular polarization plate 151a) which transmits left circularly polarized light as linearly polarized light among the light incident from the first λ/4 plate 14a side. In addition, a combination of the linear polarization plate 12 and the second λ/4 plate 14b is disposed in accordance with the slow axis and the polarization axis, so as to function as a left circular polarization plate (in FIG. 23, second left circular polarization plate 151b) which transmits left circularly polarized light as linearly polarized light, among the light incident from the second λ/4 plate 14b side.

As described above, also, in a case where one cholesteric liquid crystalline layer is configured as a layer including two or more reflection regions having different selective reflection wavelengths and the other cholesteric liquid crystalline layer is configured to be formed on a part of the λ/4 plate, the transmission decorative film can have a pattern of an image seen from one surface side and a pattern of an image seen from the other surface side different from each other, while having transparency.

Figure 24:
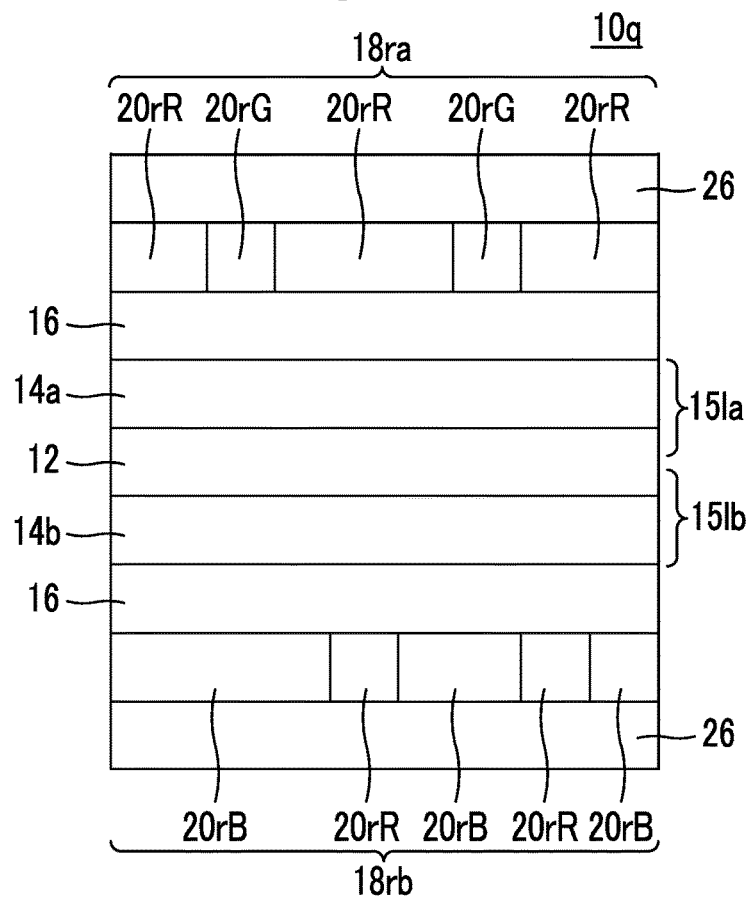
FIG. 24 is a cross section view schematically showing another example of the transmission decorative film of the present invention.

In addition, the transmission decorative film of the embodiment of the present invention may have a configuration in which a surface protective layer is laminated on a cholesteric liquid crystalline layer as a transmission decorative film 10q shown in FIG. 24.

The transmission decorative film 10q shown in FIG. 24 includes a surface protective layer 26, the first cholesteric liquid crystalline layer 18ra, the pressure sensitive adhesive layer 16, the first λ/4 plate 14a, the linear polarization plate 12, the second λ/4 plate 14b, the pressure sensitive adhesive layer 16, the second cholesteric liquid crystalline layer 18rb, and the surface protective layer 26 in this order.

The transmission decorative film 10q has the same configuration as that of the transmission decorative film 10a shown in FIG. 1, except that the surface protective layer is provided on the cholesteric liquid crystalline layer.

The surface protective layer 26 is not limited, and a well-known surface protective layer of the related art used in various laminated films can be suitably used.

For example, a base material film used as a temporary support in a case of forming a cholesteric liquid crystalline layer in a method of manufacturing a transmission decorative film which will be described later may be used as the surface protective layer. That is, a base material film used as a temporary support by forming a cholesteric liquid crystalline layer on the base material film as the temporary support, and laminating the cholesteric liquid crystalline layer on a λ/4 plate with the base material film, without peeling the cholesteric liquid crystalline layer from the base material film, may be used as the surface protective layer of the transmission decorative film.

Examples of the base material film used as the surface protective layer include a PET film, a TAC film, and an acrylic resin film.

The example shown in FIG. 24 has a configuration in which the surface protective layer is laminated on the cholesteric liquid crystalline layer of the transmission decorative film 10a shown in FIG. 1, and there is no limitation thereto, and a configuration in which the surface protective layer is laminated on the cholesteric liquid crystalline layer of each of the transmission decorative films 10b to 10p may be used.

Figure 25:
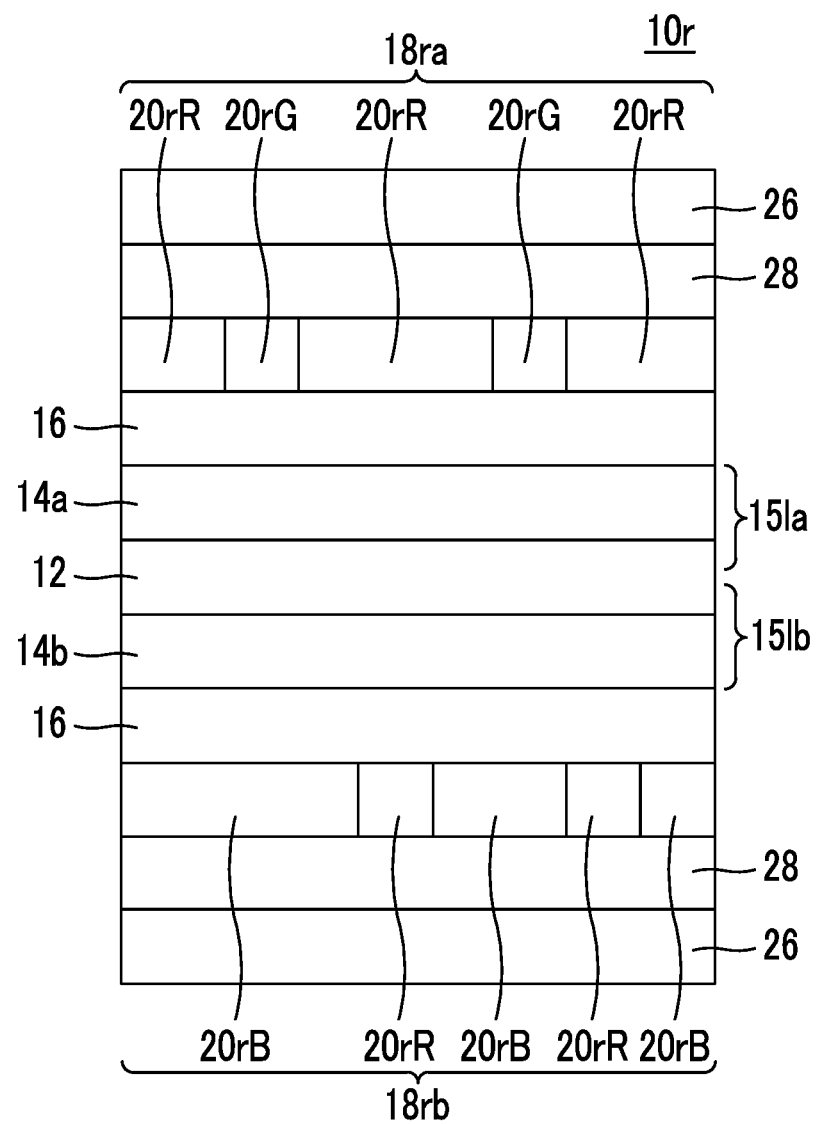
FIG. 25 is a cross section view schematically showing another example of the transmission decorative film of the present invention.

In addition, the transmission decorative film of the present invention may have a configuration in which a scattering layer is laminated on a cholesteric liquid crystalline layer, as a transmission decorative film 10r shown in FIG. 25.

The transmission decorative film 10r shown in FIG. 25 includes the surface protective layer 26, a scattering layer 28, the first cholesteric liquid crystalline layer 18ra, the pressure sensitive adhesive layer 16, the first λ/4 plate 14a, the linear polarization plate 12, the second λ/4 plate 14b, the pressure sensitive adhesive layer 16, the second cholesteric liquid crystalline layer 18rb, the scattering layer 28, and the surface protective layer 26 in this order.

The transmission decorative film 10r has the same configuration as the transmission decorative film 10q shown in FIG. 24, except that the scattering layer is provided between the cholesteric liquid crystalline layer and the surface protective layer.

With a configuration in which the scattering layer is laminated on the cholesteric liquid crystalline layer, an angle of view can be widened. A haze value of the scattering layer is not limited, and is preferably equal to or smaller than 30 more preferably equal to or smaller than 15, from a viewpoint of more excellent diffusibility of light.

The scattering layer 28 is not limited, and a well-known scattering layer of the related art used in various laminated film can be suitably used. For example, as a material of the scattering layer, a layer in which acryl, alumina, silica particles are diffused is used.

In addition, a configuration in which the cholesteric liquid crystalline layer has diffusibility by applying an alignment defect to the cholesteric liquid crystalline layer, by providing a layer for adjusting the alignment of the cholesteric liquid crystalline layer, instead of the scattering layer, may be used.

Figure 26:
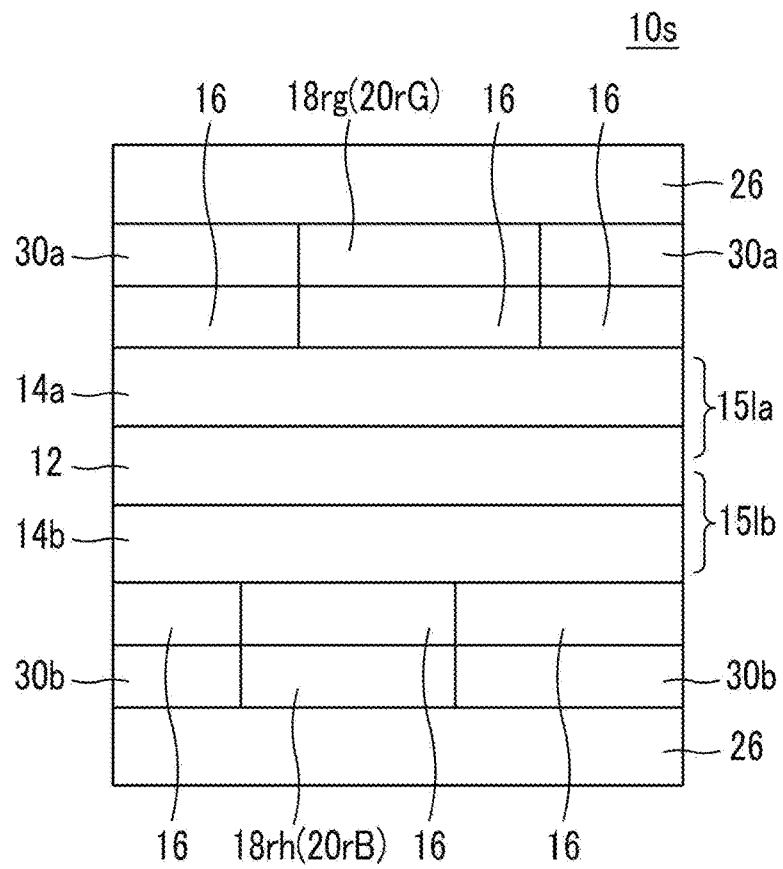
FIG. 26 is a cross section view schematically showing another example of the transmission decorative film of the present invention.

As in the transmission decorative film 10h shown in FIG. 12, in a case of using a configuration of applying a pattern to the transmission decorative film, as a configuration in which the cholesteric liquid crystalline layer is formed on a part of the λ/4 plate, a configuration including a filling layer which covers a side surface of the cholesteric liquid crystalline layer laminated on a part of the λ/4 plate, and a surface of the λ/4 plate where the cholesteric liquid crystalline layer is not formed, may be used, as in a transmission decorative film 10s shown in FIG. 26.

The transmission decorative film 10s shown in FIG. 26 includes surface protective layer 26, the first cholesteric liquid crystalline layer 18rg, a filling layer 30a, the pressure sensitive adhesive layer 16, the first λ/4 plate 14a, the linear polarization plate 12, the second λ/4 plate 14b, the pressure sensitive adhesive layer 16, the second cholesteric liquid crystalline layer 18rh, a filling layer 30b, and the surface protective layer 26.

The transmission decorative film 10s has the same configuration as that of the transmission decorative film 10h shown in FIG. 12, except that the filling layer 30a, the filling layer 30b, and the surface protective layer 26 are provided. The surface protective layer 26 has the same configuration as that of the surface protective layer 26 shown in FIG. 24.

As shown in FIG. 26, the filling layer 30a is formed on a portion of the first λ/4 plate 14a where the first cholesteric liquid crystalline layer 18rg is not formed, to have a thickness approximately the same as that of the first cholesteric liquid crystalline layer 18rg. That is, the filling layer 30a is formed to be substantially flush with the surface of the first cholesteric liquid crystalline layer 18rg. Accordingly, the filling layer 30a covers a side surface of the first cholesteric liquid crystalline layer 18rg and a surface of the first λ/4 plate 14a (surface where the first cholesteric liquid crystalline layer 18rg is not formed).

In the same manner, the filling layer 30b is formed on a portion of the second λ/4 plate 14b where the second cholesteric liquid crystalline layer 18rh is not formed, to have a thickness approximately the same as that of the second cholesteric liquid crystalline layer 18rh. That is, the filling layer 30b is formed to be substantially flush with the surface of the second cholesteric liquid crystalline layer 18rh. Accordingly, the filling layer 30b covers a side surface of the second cholesteric liquid crystalline layer 18rh and a surface of the second λ/4 plate 14b (surface where the second cholesteric liquid crystalline layer 18rh is not formed).

In a case where a configuration in which the cholesteric liquid crystalline layer is formed on a part of the λ/4 plate is used, a difference in refractive indexes of λ/4 plate differs between the region where the cholesteric liquid crystalline layer is formed and the region where the cholesteric liquid crystalline layer is not formed, that is, a difference in refractive indexes between the λ/4 plate and the cholesteric liquid crystalline layer and a difference in refractive indexes between the λ/4 plate and air are different from each other, and accordingly, in a case where stronger light is emitted or other like, a pattern formed on the cholesteric liquid crystalline layer on the rear surface side may be visually recognized from the front surface side.

On the other hand, by including the filling layer covering the side surface of the cholesteric liquid crystalline layer and the surface of the λ/4 plate, a difference in the difference in refractive indexes of the λ/4 plate between the region where the cholesteric liquid crystalline layer is formed and the region where the cholesteric liquid crystalline layer is not formed, decreases. That is, a difference in refractive indexes between the λ/4 plate and the cholesteric liquid crystalline layer and a difference in refractive indexes between the λ/4 plate and filling layer becomes close to each other, and accordingly, even in a case where stronger light is emitted or other like, a pattern formed on the cholesteric liquid crystalline layer on the rear surface side can be prevented from being visually recognized from the front surface side.

As a formation material of the filling layer 30a and the filling layer 30b, a resin having transparency can be suitably used.

Specifically, PET, TAC, an acrylic resin, polycarbonate, polyester, a cycloolefin-based polymer, an inorganic material, or an optical adhesive sheet can be used. Particularly, a material having a retardation (Re) close to 0 is preferably used and TAC and an acrylic resin are suitable.

A method of forming the filling layer is not limited. For example, the filling layer may be formed by a method of cutting a film formed of the formation material of the filling layer in accordance with the shape of the cholesteric liquid crystalline layer and bonding the film onto the λ/4 plate with a pressure sensitive adhesive or the like. Alternatively, the filling layer may be formed by a method of preparing a coating solution which is the formation material of the filling layer and applying the coating solution onto the λ/4 plate and performing the curing.

Figure 27:
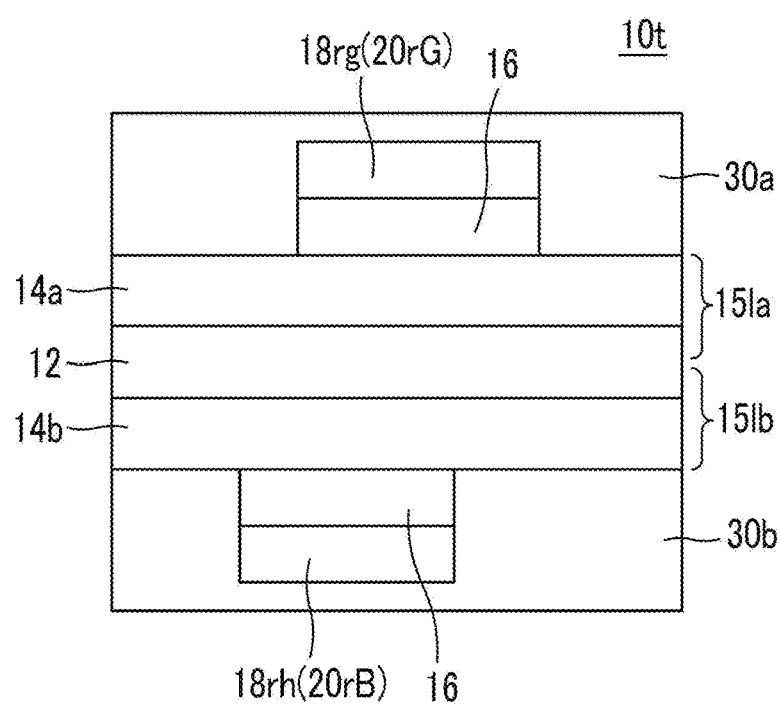
FIG. 27 is a cross section view schematically showing another example of the transmission decorative film of the present invention.

Here, in the example shown in FIG. 26, the filling layer is configured to have a substantially same thickness as that of the cholesteric liquid crystalline layer and to be formed so that the surface is flush with that of the cholesteric liquid crystalline layer, but there is no limitation, and as a transmission decorative film 10t shown in FIG. 27, a configuration in which a thickness of a filling layer is set to be thicker than a thickness of a cholesteric liquid crystalline layer to embed the cholesteric liquid crystalline layer in the filling layer may be used.

The transmission decorative film 10*t* shown in FIG. 27 includes the filling layer 30*a*, the first cholesteric liquid crystalline layer 18*rg*, the pressure sensitive adhesive layer 16, the first λ/4 plate 14*a*, the linear polarization plate 12, the second λ/4 plate 14*b*, the pressure sensitive adhesive layer 16, the second cholesteric liquid crystalline layer 18*rh*, and the filling layer 30*b*.

The transmission decorative film 10*t* has the same configuration as that of the transmission decorative film 10*h* shown in FIG. 12, except that the filling layer 30*a* and the filling layer 30*b* are provided.

As shown in FIG. 27, the filling layer 30*a* is formed to be thicker than the first cholesteric liquid crystalline layer 18*rg*, so as to embed the first λ/4 plate 14*a* and the first cholesteric liquid crystalline layer 18*rg*. Accordingly, the filling layer 30*a* is formed to cover the side surface of the first cholesteric liquid crystalline layer 18*rg* and the surface of the first λ/4 plate 14*a* (surface where the first cholesteric liquid crystalline layer 18*rg* is not formed).

In the same manner, the filling layer 30*b* is formed to be thicker than the second cholesteric liquid crystalline layer 18*rh*, so as to embed the second λ/4 plate 14*b* and the second cholesteric liquid crystalline layer 18*rh*. Accordingly, the filling layer 30*b* is formed to cover the side surface of the second cholesteric liquid crystalline layer 18*rh* and the surface of the second λ/4 plate 14*b* (surface where the second cholesteric liquid crystalline layer 18*rh* is not formed).

As described above, even in a case where a configuration in which the thickness of the filling layer is set to be thicker than that of the cholesteric liquid crystalline layer to cover the side surface of the cholesteric liquid crystalline layer and the surface of the λ/4 plate, it is possible to prevent a pattern formed on the cholesteric liquid crystalline layer on the rear surface side from being visually recognized from the front surface side, even in a case where stronger light is emitted or the like, by decreasing a difference in the difference in refractive indexes of the λ/4 plate between the region where the cholesteric liquid crystalline layer is formed and the region where the cholesteric liquid crystalline layer is not formed.

(Cholesteric Liquid Crystalline Layer)

Next, the cholesteric liquid crystalline layer (reflection region) will be described.

The cholesteric liquid crystalline layer is a layer including a cholesteric liquid crystalline phase. The cholesteric liquid crystalline layer is preferably a layer formed with a fixed cholesteric liquid crystalline phase, but there is no limitation. In a case of displaying a still image, a layer formed with a fixed cholesteric liquid crystalline phase is preferable, and in a case of displaying a motion picture, it is preferable that the cholesteric liquid crystalline phase is not fixed.

The configuration in which the cholesteric liquid crystalline phase is fixed may be a structure in which the alignment of the liquid crystal compound becoming the cholesteric liquid crystalline phase is maintained, and may be a structure in which, typically, a polymerizable liquid crystal compound is set in an alignment state of a cholesteric liquid crystalline phase, polymerized and cured by ultraviolet light irradiation or heating, to form a layer not having fluidity, and at the same time, the alignment aspect is changed to a state which does not change due to the external field or the external force. In the structure in which the cholesteric liquid crystalline phase is fixed, it is enough, as long as the optical properties of the cholesteric liquid crystalline phase are maintained, and the liquid crystal compound may not have liquid crystal properties. For example, the polymerizable liquid crystal compound may lose liquid crystal properties due to an increase in molecular weight due to a curing reaction.

As the material used in the formation of the cholesteric liquid crystalline layer, a liquid crystal composition including a liquid crystal compound or the like is used. The liquid crystal compound is preferably a polymerizable liquid crystal compound.

The liquid crystal composition including a polymerizable liquid crystal compound may further include a surfactant, a chiral agent, or a polymerization initiator.

—Polymerizable Liquid Crystal Compound—

The polymerizable liquid crystal compound may be a rod-like liquid crystal compound or a disk-like liquid crystal compound, and a rod-like liquid crystal compound is preferably used.

As an example of a rod-like polymerizable liquid crystal compound for forming the cholesteric liquid crystalline layer, a rod-like nematic liquid crystal compound may be used. As a rod-like nematic liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenylcyclohexylbenzonitriles are preferably used. Not only a low-molecular-weight liquid crystal compound, but also a high-molecular-weight liquid crystal compound can be used.

A polymerizable liquid crystal compound is obtained by introducing a polymerizable group to the liquid crystal compound. Examples of the polymerizable group include an unsaturated polymerizable group, an epoxy group, and an aziridinyl group, an unsaturated polymerizable group is preferable and an ethylenically unsaturated polymerizable group is more preferable. The polymerizable group can be introduced into molecules of the liquid crystal compound by various methods. The number of polymerizable groups included in the polymerizable liquid crystal compound is preferably 1 to 6 and more preferably 1 to 3. Examples of the polymerizable liquid crystal compound include compounds disclosed in Makromol. Chem., vol. 190, 2255 p, (1989), Advanced Materials, vol. 5, 107 p (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-1107-110469A), JP1999-080081A (JP-H11-080081A), and JP2001-328973A. Two or more kinds of polymerizable liquid crystal compounds may be used in combination. In a case where two or more kinds of polymerizable liquid crystal compounds are used in combination, it is possible to decrease an alignment temperature.

Specific examples of the polymerizable liquid crystal compound include compounds shown in Formulae (1) to (11).

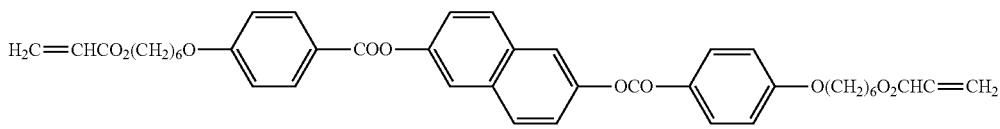

(1)

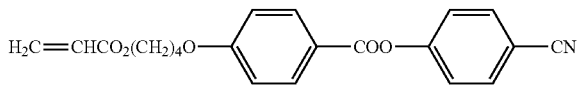

(2)

(3)

(4)

(5)

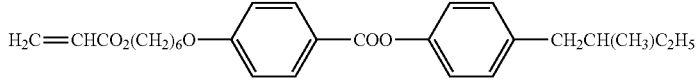

(6)

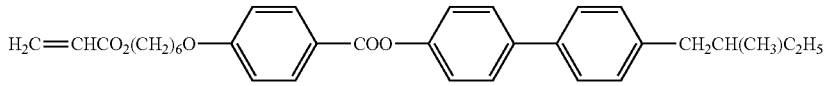

(7)

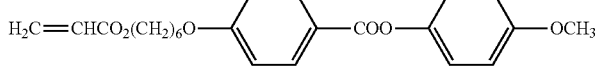

(8)

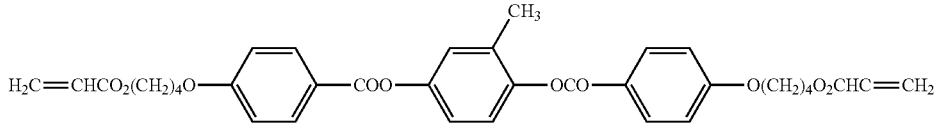

(9)

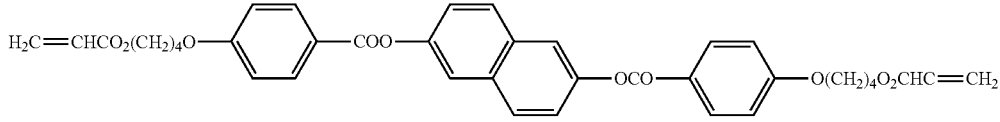

(10)

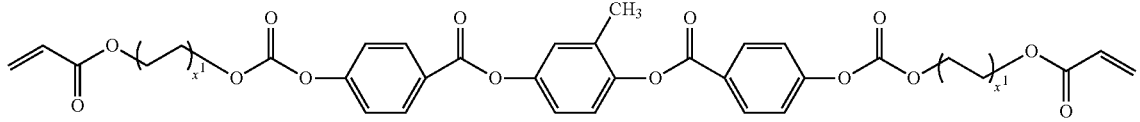

(11)

[In the compound (11), $X^1$ is 2 to 5 (integer).]

In addition, as the polymerizable liquid crystal compound other than the polymerizable liquid crystal compound described above, a cyclic organopolysiloxane compound including a cholesteric phase disclosed in JP1982-165480A (JP-S57-165480A) can be used. Further, as the high-molecular-weight liquid crystal compound described above, a polymer obtained by introducing a mesogenic group having liquid crystal to a main chain, a side chain, or both positions of the main chain and the side chain, a high-molecular-weight cholesteric liquid crystal obtained by introducing a cholesteric group to a side chain, a liquid crystal polymer disclosed in JP1997-133810A (JP-H09-133810A), and a liquid crystal polymer disclosed in JP1999-293252A (JP-H11-293252A) can be used.

In addition, the added amount of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

—Chiral Agent (Optically Active Compound)—

The chiral agent has a function of inducing the helical structure of the cholesteric liquid crystalline phase. Since the induced twisted direction of the helix or the helical pitch varies according to the compound, the chiral compound may be selected according to the purpose.

The chiral agent is not particularly limited, and well-known compounds (for example, Liquid Crystal Device Handbook, third vol. paragraphs 4-3, a chiral agent for twisted nematic (TN) or super-twisted nematic (STN), p. 199, Japan Society for the Promotion of Science 142th Committee Edition, 1989), isosorbide, or an isomannide derivative can be used.

The chiral agent generally includes asymmetric carbon atoms, but an axial asymmetric compound or a planar asymmetric compound not including asymmetric carbon atoms can be used as the chiral agent. As an example of an axial asymmetric compound or a planar asymmetric compound, binaphthyl, helicene, paracyclophane, and derivatives thereof are included. The chiral agent may include a polymerizable group. In a case where both of the chiral agent and the liquid crystal compound include a polymerizable group, it is possible to form a polymer including a repeating unit derived from the polymerizable liquid crystal compound and a repeating unit derived from the chiral agent, by the polymerization reaction between the polymerizable chiral agent and the polymerizable liquid crystal compound. In this aspect, the polymerizable group included in the polymerizable chiral agent is preferably the same kind of group as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and particularly preferably an ethylenically unsaturated polymerizable group.

In addition, the chiral agent may be a liquid crystal compound.

As will be described later, in a case of controlling a size of the helical pitch of the cholesteric liquid crystalline phase in accordance with the light irradiation, in a case of manufacturing the cholesteric liquid crystalline layer, a chiral agent sensitive to light and capable of changing the helical pitch of the cholesteric liquid crystalline phase (hereinafter, also referred to as a photosensitive chiral agent) is preferably used.

The photosensitive chiral agent is a compound, the structure of which is changed by absorbing light, and which changes the helical pitch of the cholesteric liquid crystalline phase. As such a compound, a compound which causes at least one of a photoisomerization reaction, a photo dimerization reaction, and a photodegradation reaction is preferable.

The compound causing the photoisomerization reaction is a compound causing stereoisomerization or structure isomerization reaction by the operation of light. Examples of the photoisomerization compound include an azobenzene compound, and a spiropyran compound.

In addition, the compound causing the photo dimerization reaction is a compound which cyclizes by causing an addition reaction between two groups due to the light irradiation. Examples of the photo dimerization compound include a cinnamic acid derivative, a coumarin derivative, a chalcone derivative, and a benzophenone derivative.

As the photosensitive chiral agent, a chiral agent represented by General Formula (I) is preferably used. This chiral agent may change an alignment structure of the helical pitch (twisting force or angle of twist of helix) of the cholesteric liquid crystalline phase in accordance with light intensity during the light irradiation.

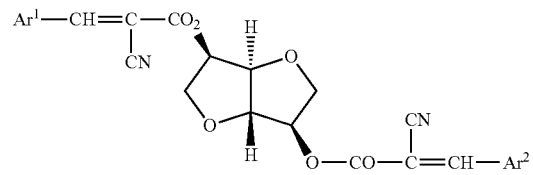

General Formula (I)

In General Formula (I), $Ar^1$ and $Ar^2$ represent an aryl group or a heteroaromatic ring group.

The aryl group represented by $Ar^1$ and $Ar^2$ may include a substituent, a total number of carbon atoms is preferably 6 to 40 and more preferably 6 to 30. As the substituent, for example, a halogen atom, an alkyl group, an alkenyl group, an alkynyl group, an alkoxy group, a hydroxyl group, an acyl group, an alkoxycarbonyl group, an aryloxycarbonyl group, an acyloxy group, a carboxyl group, a cyano group, or a heterocyclic group is preferable, and a halogen atom, an alkyl group, an alkenyl group, an alkoxy group, a hydroxyl group, an acyloxy group, an alkoxycarbonyl group or an aryloxycarbonyl group is more preferable.

Among such aryl groups, an aryl group represented by General Formula (III) or (IV) is preferable.

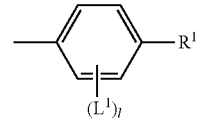

General Formula (III)

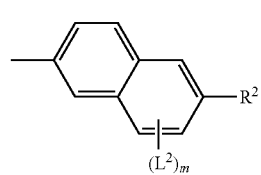

General Formula (IV)

$R^1$ in General Formula (III) and $R^2$ in General Formula (IV) each independently represent a hydrogen atom, a halogen atom, an alkyl group, an alkenyl group, an alkynyl group, an aryl group, a heterocyclic group, an alkoxy group, a hydroxyl group, an acyl group, an alkoxycarbonyl group, an aryloxycarbonyl group, an acyloxy group, a carboxyl group, or a cyano group. Among these, a hydrogen atom, a halogen atom, an alkyl group, an alkenyl group, an aryl group, an alkoxy group, a hydroxyl group, an alkoxycarbonyl group, an aryloxycarbonyl group, or an acyloxy group is preferable, and an alkoxy group, a hydroxyl group, or an acyloxy group is more preferable.

$L^1$ in General Formula (III) and $L^2$ in General Formula (IV) each independently represent a halogen atom, an alkyl group, an alkoxy group, or a hydroxyl group, and an alkoxy group having 1 to 10 carbon atoms or a hydroxyl group is preferable.

l represents an integer of 0, 1 to 4 and 0 or 1 is preferable.
m represents an integer of 0, 1 to 6 and 0 or 1 is preferable.
In a case where l or m is equal to or greater than 2, $L^1$ and $L^2$ may represent groups different from each other.

A heteroaromatic ring group represented by $Ar^1$ and $Ar^2$ may include a substituent, and a total number of carbon atoms is preferably 4 to 40 and more preferably 4 to 30. As the substituent, for example, a halogen atom, an alkyl group, an alkenyl group, an alkynyl group, an aryl group, an alkoxy group, a hydroxyl group, an acyl group, an alkoxycarbonyl group, an aryloxycarbonyl group, an acyloxy group, or a cyano group is preferable, and a halogen atom, an alkyl group, an alkenyl group, an aryl group, an alkoxy group, or an acyloxy group is more preferable.

Examples of the heteroaromatic ring group include a pyridyl group, a pyrimidinyl group, a furyl group, and a benzofuranyl group, and among these, a pyridyl group or a pyrimidinyl group is preferable.

A content of the chiral agent in the liquid crystal composition is preferably 0.01 mol % to 200 mol % and more preferably 1 mol % to 30 mol % with respect to the amount of the polymerizable liquid crystal compound.

—Polymerization Initiator—

In a case where the liquid crystal composition includes the polymerizable compound, the liquid crystal composition preferably includes a polymerization initiator. In an aspect of causing the polymerization reaction to proceed using the ultraviolet light irradiation, the polymerization initiator used is preferably a photopolymerization initiator which can start the polymerization reaction by an ultraviolet light irradiation. Examples of the photopolymerization initiator include an α-carbonyl compound (disclosed in each specification of U.S. Pat. Nos. 2,367,661A and 2,367,670A), acyloin ether (disclosed in the specification of U.S. Pat. No. 2,448,828A), an α-hydrocarbon-substituted aromatic acyloin compound (disclosed in the specification of U.S. Pat. No. 2,722,512A), a polynuclear quinone compound (disclosed in each specification of U.S. Pat. Nos. 3,046,127A and 2,951,758A), a combination of a triaryl imidazole dimer and p-amino phenyl ketone (disclosed in the specification of U.S. Pat. No. 3,549,367A), acridine and phenazine compounds (disclosed in each specification of JP1985-105667A (JP-S60-105667A) and U.S. Pat. No. 4,239,850A), and an oxadiazole compound (disclosed in the specification of U.S. Pat. No. 4,212,970A).

A content of the photopolymerization initiator in the liquid crystal composition is preferably 0.1% to 20% by mass and more preferably 0.5% by mass to 12% by mass, with respect to the content of the polymerizable liquid crystal compound.

—Cross-Linking Agent—

The liquid crystal composition may randomly include a cross-linking agent, in order to improve film hardness after the curing and durability. As the cross-linking agent, a material which is cured by ultraviolet light, heat, or humidity can be suitably used.

The cross-linking agent is not particularly limited and can be suitably selected according to the purpose, and examples thereof include a polyfunctional acrylate compound such as trimethylolpropane tri(meth)acrylate or pentaerythritol tri(meth)acrylate; an epoxy compound such as glycidyl (meth)acrylate or ethylene glycol diglycidyl ether; an aziridine compound such as 2,2-bishydroxymethylbutanol-tris[3-(1-aziridinyl)propionate] or 4,4-bis (ethylene iminocarbonyl amino)diphenylmethane; an isocyanate compound such as hexamethylene diisocyanate or biuret type isocyanate; a polyoxazoline compound including an oxazoline group as a side chain; and an alkoxysilane compound such as vinyltrimethoxysilane or N-(2-aminoethyl)3-aminopropyltrimethoxysilane. In addition, a well-known catalyst can be used according to the reactivity of the cross-linking agent and it is possible to improve productivity, in addition to the improvement of film hardness and durability. These may be used alone or in combination of two or more kinds thereof.

A content of the cross-linking agent is preferably 3% by mass to 20% by mass and more preferably 5% by mass to 15% by mass. In a case where the content of the cross-linking agent is less than 3% by mass, the effect of the cross-linking density improvement may not be obtained, and in a case where the content thereof exceeds 20% by mass, stability of the cholesteric liquid crystalline layer may be deteriorated.

—Other Additives—

If necessary, a surfactant, a polymerization inhibitor, an antioxidant, a horizontal alignment agent, an ultraviolet absorbing agent, a light stabilizer, a coloring material, and metal oxide fine particles can be added to the liquid crystal composition, in a range not decreasing the optical performance.

The liquid crystal composition may include a solvent. The solvent is not particularly limited and can be suitably selected according to the purpose, and an organic solvent is preferable.

The organic solvent is not particularly limited and can be suitably selected according to the purpose, and examples thereof include ketones such as methyl ethyl ketone, methyl isobutyl ketone alkyl halides, amides, sulfoxides, heterocyclic compounds, hydrocarbons, esters, and ethers. These may be used alone or in combination of two or more kinds thereof. Among these, in a case of considering the environmental load, ketones are particularly preferable. The component described above such as the monofunctional polymerizable monomer may function as a solvent.

(Method of Manufacturing Transmission Decorative Film)

Hereinafter, the method of manufacturing the transmission decorative film will be described.

Figure 28:
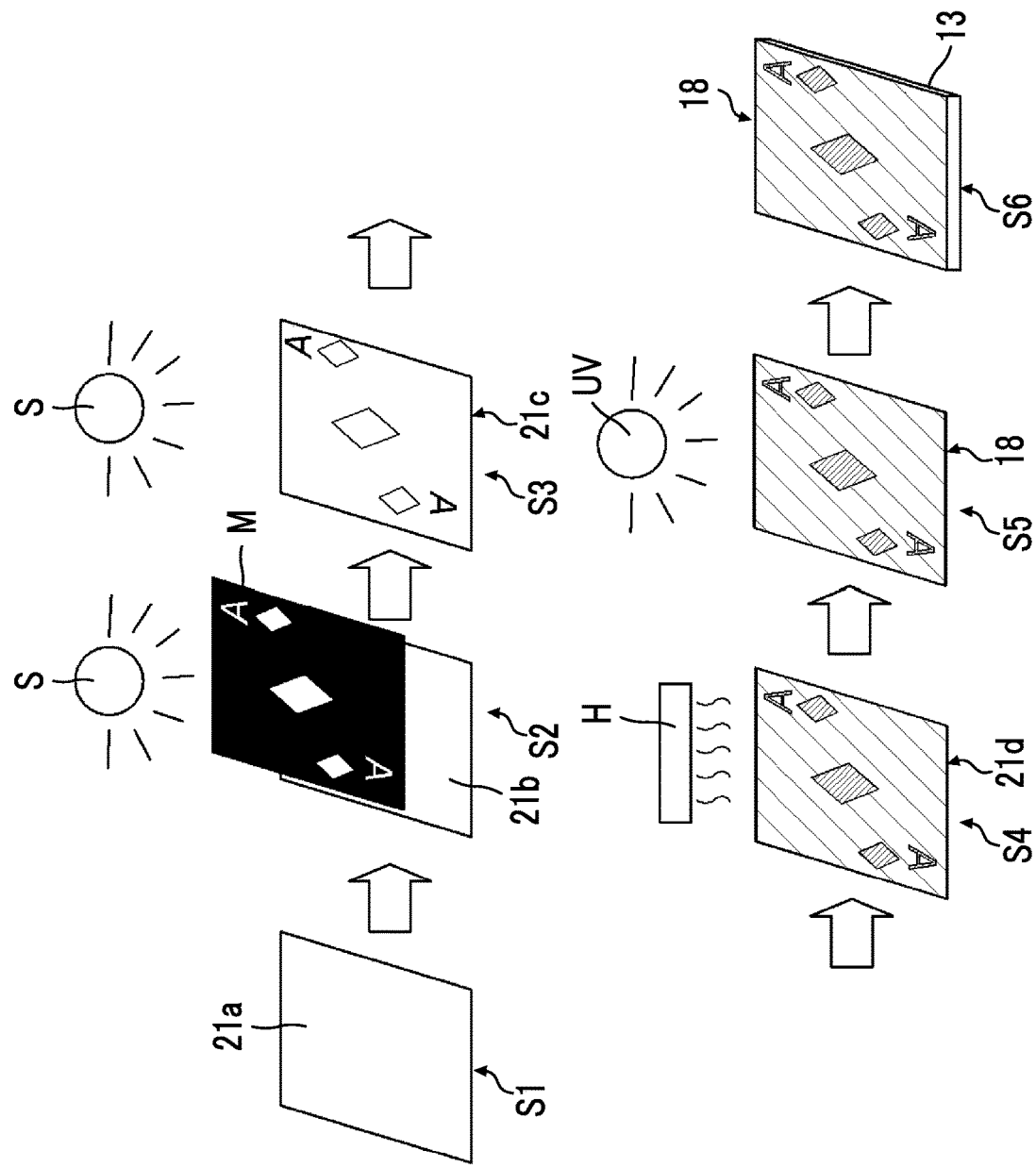
FIG. 28 is a schematic view for describing an example of a method of manufacturing a transmission decorative film of the present invention.

First, an example of the method of manufacturing the transmission decorative film including a cholesteric liquid crystalline layer including two or more reflection regions having different selective reflection wavelength, as the transmission decorative film 10a shown in FIG. 1, is shown with reference to FIG. 28.

First, as a step S1, a liquid crystal composition including a polymerizable liquid crystal compound and a photosensitive chiral agent is applied onto a temporary support (not shown) to form a coating 21a. As the coating method, a well-known method can be used. If necessary, after applying the liquid crystal composition, a drying treatment may be performed.

Next, as a step S2, the exposure treatment is performed with respect to the coating 21a with an exposure apparatus S which emits light at a wavelength to which the photosensitive chiral agent is sensitive, through a mask M having a predetermined opening pattern, and a partially exposed coating 21b is formed. The photosensitive chiral agent is sensitive to light in the exposure portion of the coating 21b and the structure thereof changes.

Next, as a step S3, the mask M is extracted, and the exposure treatment is performed again with respect to the coating 21b by emitting light at a wavelength to which the photosensitive chiral agent is sensitive from the exposure apparatus S, and an exposed coating 21c is formed.

Next, as a step S4, a heating treatment (maturing treatment) was performed with respect to the coating 21c using a heating device H, and a heated coating 21d is formed. In the coating 21d, a liquid crystal compound is aligned and a cholesteric liquid crystalline phase is formed. In the coating 21d, two regions having different exposed amount are provided, and in each region, a length of a helical pitch of the cholesteric liquid crystalline phase is different in accordance with the exposed amount. Accordingly, two reflection regions having different selective reflection wavelengths are formed.

Next, as a step S5, a curing treatment with ultraviolet light irradiation was performed with respect the coating 21*d* using an ultraviolet light irradiation device UV, and a cholesteric liquid crystalline layer 18 which is a layer with the fixed cholesteric liquid crystalline phase is formed.

Then, as a step S6, the formed cholesteric liquid crystalline layer 18 is peeled off from the temporary support, and the peeled cholesteric liquid crystalline layer 18 is laminated on one λ/4 plate of a laminate 13 of the first λ/4 plate 14*a*, the linear polarization plate 12, and the second λ/4 plate 14*b* through the pressure sensitive adhesive layer 16 (not shown).

The same operation is performed on the other surface to form the cholesteric liquid crystalline layer 18, and the cholesteric liquid crystalline layer 18 is laminated on the other λ/4 plate of the laminate 13, and accordingly, a transmission decorative film is manufactured.

The method of manufacturing the cholesteric liquid crystalline layer including two reflection regions having different selective reflection wavelengths by using the photosensitive chiral agent has been described, but the method is not limited to this aspect, and for example, other well-known methods such as a method disclosed in JP2009-300662A can be used.

In addition, as a method of forming the cholesteric liquid crystalline layer, a laser direct writing exposure apparatus can be used. The cholesteric liquid crystalline layer having a predetermined pattern can be obtained by adjusting the exposed amount, the number of times of exposure, the exposure time, and the like according to the position of the layer using the laser direct writing exposure apparatus, in a case of irradiating the non-cured cholesteric liquid crystalline layer (coating) with light.

In a case of forming the cholesteric liquid crystalline layer not having the fixed cholesteric liquid crystalline phase, the manufacturing can be performed by the manufacturing method of performing the steps S1 to S4 and the step S6, without performing the step S5.

In addition, in a case of using the liquid crystal compound capable of being aligned at room temperature, the cholesteric liquid crystalline layer can be formed without performing the heating treatment of the step S4.

Here, as described above, in a case of manufacturing a transmission decorative film including a surface protective layer, as the transmission decorative film 10*q* shown in FIG. 24, a cholesteric liquid crystalline layer may be formed on a base material film by the method described above using the base material film which is the surface protective layer as the temporary support, and the cholesteric liquid crystalline layer may be laminated on the λ/4 plate together with the base material film, without peeling the cholesteric liquid crystalline layer from the base material film.

In a case of manufacturing a transmission decorative film including a scattering layer and a surface protective layer, as the transmission decorative film 10*r* shown in FIG. 25, a scattering layer may be formed on a base material film which is the surface protective layer, a cholesteric liquid crystalline layer may be formed on the scattering layer side by using the base material film, on which the scattering layer is formed, as the temporary support, and the cholesteric liquid crystalline layer, the scattering layer, and the base material film may be laminated on a λ/4 plate.

A formation method in a case of forming the scattering layer on the base material film is not limited, and the formation method according to the configuration of the scattering layer may be used. For example, in a case of forming an acrylic resin layer as the scattering layer, the layer may be formed by applying an acrylic solution onto the base material film with a bar coater or the like.

Next, a method of manufacturing a transmission decorative film having a configuration in which a cholesteric liquid crystalline layer is laminated on a part of a λ/4 plate, as the transmission decorative film 10*h* shown in FIG. 12 will be described.

First, a cholesteric liquid crystalline layer is formed on a temporary support, in the same manner as in the manufacturing method described with reference to FIG. 28.

Next, the formed cholesteric liquid crystalline layer is cut out to have a desired shape. A method of cutting the cholesteric liquid crystalline layer is not limited, and the cholesteric liquid crystalline layer may be cut out by using a cutting tool such as a cutter.

After that, the cut-out cholesteric liquid crystalline layer is laminated on a λ/4 plate through a pressure sensitive adhesive layer.

The cut-out cholesteric liquid crystalline layer is laminated on both surfaces (on λ/4 plate) of a laminate of two λ/4 plates and the linear polarization plate, and accordingly, a transmission decorative film is manufactured.

In addition the method of forming the cholesteric liquid crystalline layer in a desired shape is not limited to a configuration of cutting out the cholesteric liquid crystalline layer in a desired shape, after forming the cholesteric liquid crystalline layer in a flat film shape. For example, the cholesteric liquid crystalline layer having a desired shape may be formed by forming a coating having a desired shape on a temporary support by printing such as an ink jet printing method, a gravure printing method, or a flexographic printing method, and then performing the exposure treatment, the heating treatment, and the curing treatment.

Figure 29:
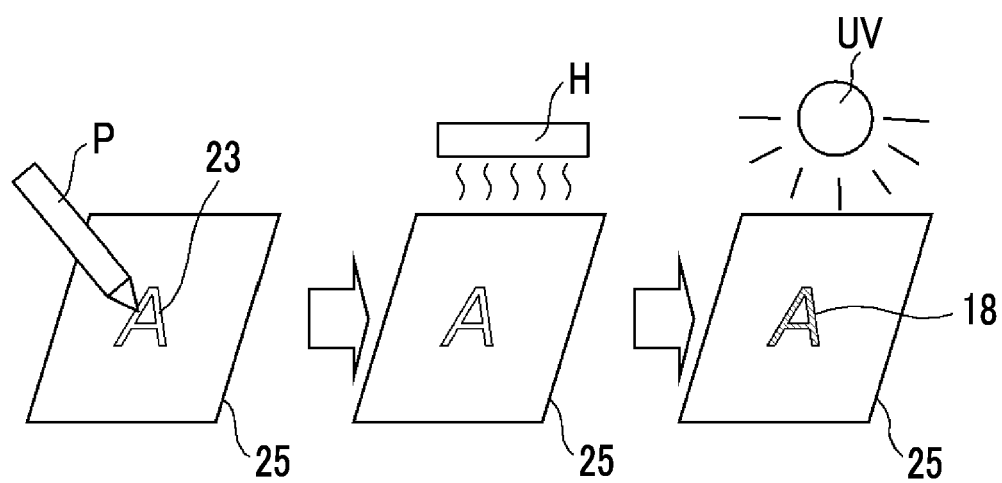
FIG. 29 is a schematic view for describing another example of the method of manufacturing a transmission decorative film of the present invention.

Next, a method of manufacturing a transmission decorative film having a configuration in which a cholesteric liquid crystalline layer is formed on a surface layer film, as the transmission decorative film 10*l* shown in FIG. 19 will be described with reference to FIG. 29.

First, the liquid crystal composition is applied on one surface layer film of a laminate 25 in which a surface layer film, a first λ/4 plate, a linear polarization plate, a second λ/4 plate, and a surface layer film are laminated in this order, in a desired shape, to form a coating 23.

The coating layer is not limited, and the coating may be performed with a pen type coating device P shown in the drawing by using the liquid crystal composition as an ink, or the coating may be performed by a printing method such as an ink jet printing method, a gravure printing method, or a flexographic printing method.

Next, the exposure treatment and the heating treatment with the heating device H are performed, and then, the curing treatment with the ultraviolet light irradiation using the ultraviolet light irradiation device UV is performed, and a cholesteric liquid crystalline layer 18 which is a layer with the fixed cholesteric liquid crystalline phase is formed.

The transmission decorative film is manufactured by performing the treatment described above on both surfaces of the laminate 25.

[Usage]

The usage of the transmission decorative film of the present invention is not particularly limited, and the transmission decorative film can be used, for example, as an advertising medium attached to a window glass as window advertisement of a building, an advertising medium, a lighting part, or a designed decoration attached to a window glass of a car, a taxi, a bus, or a train, a traffic sign, a window glass of a house, a store, an aquarium, a zoo, a botanic garden, or a gallery, such or stationeries such as a game machine, a card for a game, or an underlay for a note, equipment for a stage or a theater, a transparent member of an elevator, an escalator, or stairs, a fashion member of a bag, a cloth, goggles, or sunglasses; or a material of interior fabrics for wall, curtain, or floor, point of purchase advertising (POP), a business card, a sticker, a postcard, a photo, a coaster, a ticket, a fan, a folding fan, a tent, a window blind, a shutter, a protective shield, a separator such as a partitioning screen, home appliances (a camera, an instant camera, a personal computer (PC), a smart phone, a television, a recorder, a microwave oven, an audio player, a game machine, a virtual reality (VR) head set, a vacuum cleaner, or a washing machine), a smart phone cover, a stuffed toy, a cup, a dish, a plate, a pot, a vase, a desk, a chair, a case for compact disc (CD) or a DVD, a book, a calendar, a pet bottle, a food packaging container, musical equipment such as a guitar or a piano, sporting goods such as a racket, a bat, a glove, or a ball, attractions of an amusement park such as a maze, a Ferris wheel, a roller coaster, or a ghost house, imitation flower, education toys, a product of a board game, an umbrella, a cane, a watch, a music box, accessories such as a necklace, a container of cosmetics, or a cover for a solar panel, an electric light, or a lamp.

In the example described above, the transmission decorative film displays a still image by the reflected light of the cholesteric liquid crystalline layer, but there is no limitation.

For example, by referring to methods disclosed in US2016/0033806A, JP5071388B, OPTICS EXPRESS 2016 vol. 24 No. 20 P23027-23036, the cholesteric liquid crystalline layer is not UV-cured and is set in a state where the alignment of the liquid crystalline phase of the cholesteric liquid crystalline layer can be changed due to a voltage application or a temperature change, and accordingly, a pattern of the cholesteric liquid crystalline layer is changed to change pictures and characters displayed, that is, a motion picture may be displayed.

Hereinabove, the transmission decorative film of the present invention has been described in detail, but the present invention is not limited to the examples described above, and various improvements or changes may be performed within a range not departing the gist of the present invention.

EXAMPLES

Hereinafter, the present invention will be described more specifically with reference to examples. The material, the reagent, the used amount, the amount of substance, the rate, the processing details, and process procedures shown in the following examples can be suitably changed, as long as the gist of the present invention is not departed. Therefore, the scope of the present invention is not limitedly translated by the specific examples shown below.

Example 1

As Example 1, the transmission decorative film 10a having the configuration shown in FIG. 1 was manufactured.

(Preparation of Liquid Crystal Composition)

A composition shown below was stirred and dissolved in a container heated at 25° C. and a cholesteric liquid crystalline ink solution A (liquid crystal composition) was prepared.

| Cholesteric liquid crystalline ink solution A |
|---|
| Liquid crystal compound 1 shown below: 1 g |
| Chiral agent 1 having a structure below: 107 mg |
| Horizontal alignment agent 1 having a structure below: 1 mg |
| Initiator: IRGACURE 907 (manufactured by BASF): 40 mg |
| IRGANOX 1010: 10 mg |
| MEK (methyl ethyl ketone): 1.6 g |

Liquid crystal Compound 1

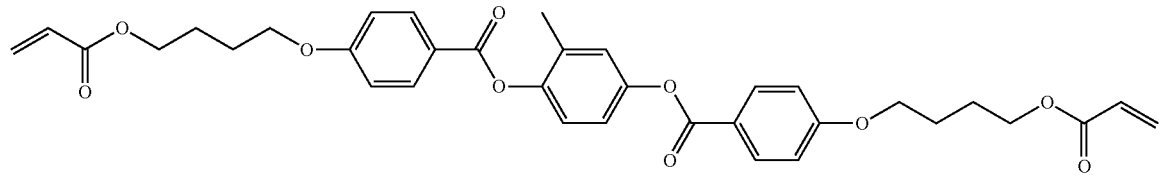

Chiral Agent 1

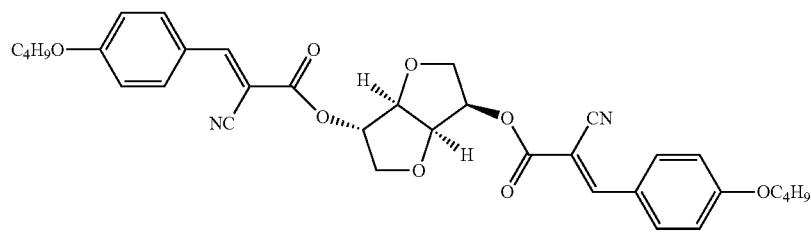

Horizontal Alignment 1

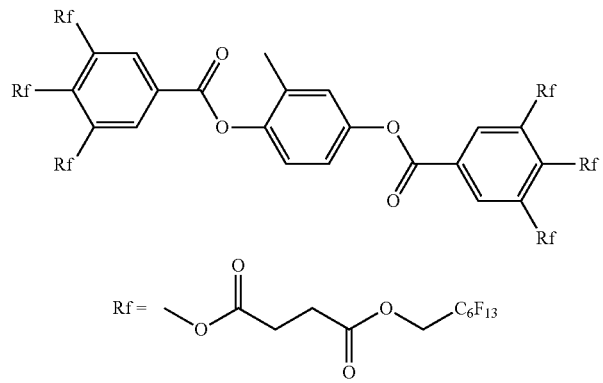

(Formation of Cholesteric Liquid Crystalline Layer)

The cholesteric liquid crystalline ink solution A prepared as described above was applied onto a temporary support with a wire bar by using a PET (polyethylene terephthalate, COSMOSHINE A4100) film manufactured by Toyobo Co., Ltd. having a thickness of 100 μm as the temporary support. The coating was performed at room temperature by adjusting a thickness of a coating after drying becomes approximately 2 to 5 μm, and a coating was formed.

Then, the UV (ultraviolet light) irradiation was performed with respect to the coating for a certain time through a black mask having a predetermined opening pattern, under oxygen atmosphere at room temperature. Then, the UV irradiation was performed for a certain time after removing the mask. The exposed amount of a portion without the mask was set as 50 mJ/cm$^2$, and the exposed amount of a portion with the mask was set as 15 mJ/cm$^2$.

In this example, as the light source of the UV irradiation, "EXECURE 3000-W" (manufactured by HOYA CANDEO OPTRONICS) was used in the step of curing the cholesteric liquid crystalline layer, and UV TRANSILLUMINATOR LM-26 TYP (manufactured by Funakoshi Co., Ltd.) was used in the step of adjusting a pitch of a helical structure of the cholesteric liquid crystalline phase.

Next, the temporary support on which the coating after the UV irradiation was laminated, was left on a hot plate at 100° C. for 1 minute, and the heating treatment was performed.

Then, the UV irradiation was performed with respect to the coating after the heating treatment for a certain time under nitrogen atmosphere (oxygen concentration of 500 ppm or less) at room temperature, to cure the coating, and a cholesteric liquid crystalline layer R1 including two or more kinds of reflection regions having different selective reflection wavelengths was formed. The formed cholesteric liquid crystalline layer R1 has right-twisted cholesteric liquid crystalline phase and reflects right circularly polarized light.

The cholesteric liquid crystalline layer R1 used as the first cholesteric liquid crystalline layer and the cholesteric liquid crystalline layer R1 used as the second cholesteric liquid crystalline layer were respectively formed by using masks having different opening patterns.

(Transfer of Cholesteric Liquid Crystalline Layer)

Meanwhile, a laminate A in which a first λ/4 plate (MCR140N: manufactured by Mecanusa Inc.), a linear polarization plate (MCR140N: manufactured by Mecanusa Inc.), and a second λ/4 plate (MCR140N: manufactured by Mecanusa Inc.) were laminated in this order was prepared. The linear polarization plate and the λ/4 plate were bonded to each other with a pressure sensitive adhesive layer (MCS70: manufactured by Mecanusa Inc.). Also in the laminate which will be described later, the linear polarization plate and the λ/4 plate were bonded to each other with a pressure sensitive adhesive layer (MCS70: manufactured by Mecanusa Inc.).

In the laminate A, a combination of the first λ/4 plate and the linear polarization plate is laminated so as to be a left circular polarization plate, and a combination of the second λ/4 plate and linear polarization plate is laminated so as to be a left circular polarization plate.

Next, a first cholesteric liquid crystalline layer was bonded onto the first λ/4 plate of the laminate through a pressure sensitive adhesive layer (MCS70: manufactured by Mecanusa Inc.), a second cholesteric liquid crystalline layer was bonded onto the second λ/4 plate through the pressure sensitive adhesive layer, and accordingly, a transmission decorative film was manufactured.

Example 2

The transmission decorative film 10b having the configuration shown in FIG. 5 was manufactured in the same manner as in Example 1, except that a cholesteric liquid crystalline layer was formed using a cholesteric liquid crystalline ink solution B shown below instead of the cholesteric liquid crystalline ink solution A, and a laminate B shown below was used instead of the laminate A.

The cholesteric liquid crystalline ink solution B is the same as the cholesteric liquid crystalline layer ink solution A, except that a chiral agent 3 shown below was used as the chiral agent.

A cholesteric liquid crystalline layer L1 formed by using the cholesteric liquid crystalline ink solution B has left-twisted cholesteric liquid crystalline phase and reflects left circularly polarized light.

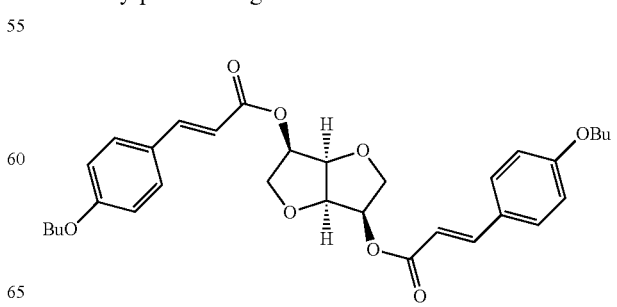

Chiral Agent 3

In the laminate B, the first λ/4 plate and the linear polarization plate are laminated so as to be a right circular polarization plate and the second λ/4 plate and the linear polarization plate are laminated so as to be a right circular polarization plate.

Example 3

The transmission decorative film 10c having the configuration shown in FIG. 6 was manufactured in the same manner as in Example 1, except that the cholesteric liquid crystalline layer L1 was used as the second cholesteric liquid crystalline layer and a laminate C shown below was used instead of the laminate A.

In the laminate C, the first λ/4 plate and the linear polarization plate are laminated so as to be a left circular polarization plate and the second λ/4 plate and the linear polarization plate are laminated so as to be a right circular polarization plate.

Example 4

As Example 4, the transmission decorative film 10h having the configuration shown in FIG. 12 was manufactured.

(Preparation of Liquid Crystal Composition)

A composition shown below was stirred and dissolved in a container heated at 25° C. and a cholesteric liquid crystalline ink solution C (liquid crystal composition) was prepared.

---
Cholesteric liquid crystalline ink solution C
---
Mixture of liquid crystal compounds described above: 1 g
Chiral agent 2 having a structure below: 55.5 mg
Horizontal alignment agent 1 having the structure described above: 1 mg
Initiator: IRGACURE 907 (manufactured by BASF): 40 mg
IRGANOX 1010: 10 mg
MEK (methyl ethyl ketone): 1.6 g
---

(Formation of Cholesteric Liquid Crystalline Layer)

The cholesteric liquid crystalline ink solution C prepared as described above was applied onto a temporary support with a wire bar by using a PET (polyethylene terephthalate, COSMOSHINE A4100) film manufactured by Toyobo Co., Ltd. having a thickness of 100 μm as the temporary support. The coating was performed at room temperature by adjusting a thickness of a coating after drying becomes approximately 2 to 5 μm, and a coating was formed.

Next, the temporary support on which the coating was laminated, was left on a hot plate at 100° C. for 1 minute, and the heating treatment was performed.

Then, the UV irradiation was performed with respect to the coating after the heating treatment for a certain time under nitrogen atmosphere (oxygen concentration of 500 ppm or less) at room temperature, to cure the coating.

After that, the cured coating was cut to have a desired shape, and a cholesteric liquid crystalline layer R2 was formed. The formed cholesteric liquid crystalline layer R2 has right-twisted cholesteric liquid crystalline phase and reflects right circularly polarized light.

The cholesteric liquid crystalline layer R2 used as the first cholesteric liquid crystalline layer and the cholesteric liquid crystalline layer R2 used as the second cholesteric liquid crystalline layer were cut to have different shapes from each other.

(Transfer of Cholesteric Liquid Crystalline Layer)

The first cholesteric liquid crystalline layer was bonded onto the first λ/4 plate of the laminate A through the pressure sensitive adhesive layer, the second cholesteric liquid crystalline layer was bonded onto the second λ/4 plate through the pressure sensitive adhesive layer, and accordingly, a transmission decorative film was manufactured.

Example 5

The transmission decorative film 10i having the configuration shown in FIG. 16 was manufactured in the same manner as in Example 4, except that a cholesteric liquid crystalline layer was formed using a cholesteric liquid crystalline ink solution D shown below instead of the cholesteric liquid crystalline ink solution C, and the laminate B was used instead of the laminate A.

The cholesteric liquid crystalline ink solution D is the same as the cholesteric liquid crystalline layer ink solution C, except that the chiral agent 2 was used as the chiral agent.

Chiral Agent 2

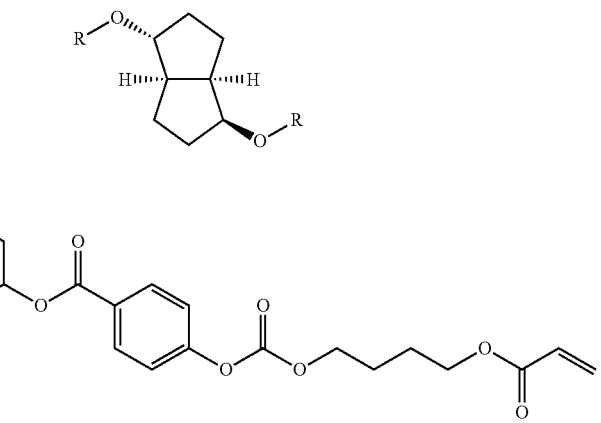

A cholesteric liquid crystalline layer L2 formed by using the cholesteric liquid crystalline ink solution D has left-twisted cholesteric liquid crystalline phase and reflects left circularly polarized light.

Example 6

The transmission decorative film 10j having the configuration shown in FIG. 17 was manufactured in the same manner as in Example 4, except that the cholesteric liquid crystalline layer L2 was used as the second cholesteric liquid crystalline layer and the laminate C was used as the laminate A.

Example 7

The transmission decorative film 10l having the configuration shown in FIG. 19 was manufactured by forming a cholesteric liquid crystalline layer shown below using a laminate D shown below instead of the laminate A.

The laminate D is a laminate in which a surface layer film (TAC film), a pressure sensitive adhesive layer, a first λ/4 plate, a linear polarization plate, a second λ/4 plate, a pressure sensitive adhesive layer, and a surface layer film (TAC film) are laminated in this order.

In the laminate D, a combination of the first λ/4 plate and the linear polarization plate is laminated so as to be a left circular polarization plate, and a combination of the second λ/4 plate and linear polarization plate is laminated so as to be a left circular polarization plate.

(Formation of Cholesteric Liquid Crystalline Layer)

The cholesteric liquid crystalline ink solution C was applied onto one surface layer film of the laminate D to have a desired shape. The coating was performed at room temperature by adjusting a thickness of a coating after drying becomes approximately 2 to 5 µm.

Next, the laminate D on which the coating was laminated, was left on a hot plate at 100° C. for 1 minute, and the heat treatment was performed.

Then, the UV irradiation was performed with respect to the coating after the heating treatment for a certain time under nitrogen atmosphere (oxygen concentration of 500 ppm or less) at room temperature, to cure the coating, and a cholesteric liquid crystalline layer R3 was formed.

The cholesteric liquid crystalline layer R3 was formed on the other surface layer film side in the same manner, and accordingly, a transmission decorative film was manufactured.

The cholesteric liquid crystalline layer R3 which is the first cholesteric liquid crystalline layer and the cholesteric liquid crystalline layer R3 which is the second cholesteric liquid crystalline layer were respectively formed to have shapes different from each other.

Example 8

The transmission decorative film 10m having the configuration shown in FIG. 20 was manufactured in the same manner as in Example 7, except that the cholesteric liquid crystalline layer was formed using the cholesteric liquid crystalline ink solution D instead of the cholesteric liquid crystalline ink solution C and a laminate E shown below was used instead of the laminate D.

A cholesteric liquid crystalline layer L3 formed using the cholesteric liquid crystalline ink solution D has left-twisted cholesteric liquid crystalline phase and reflects left circularly polarized light.

The laminate E is a laminate in which a surface layer film (TAC film), a pressure sensitive adhesive layer, a first λ/4 plate, a linear polarization plate, a second λ/4 plate, a pressure sensitive adhesive layer, and a surface layer film (TAC film) are laminated in this order.

In the laminate E, a combination of the first λ/4 plate and the linear polarization plate is laminated so as to be a right circular polarization plate, and a combination of the second λ/4 plate and linear polarization plate is laminated so as to be a right circular polarization plate.

Example 9

The transmission decorative film 10n having the configuration shown in FIG. 21 was manufactured in the same manner as in Example 7, except that the cholesteric liquid crystalline layer L3 was used as the second cholesteric liquid crystalline layer and a laminate F shown below was used instead of the laminate D.

The laminate F is a laminate in which a surface layer film (TAC film), a pressure sensitive adhesive layer, a first λ/4 plate, a linear polarization plate, a second λ/4 plate, a pressure sensitive adhesive layer, and a surface layer film (TAC film) are laminated in this order.

In the laminate F, a combination of the first λ/4 plate and the linear polarization plate is laminated so as to be a left circular polarization plate, and a combination of the second λ/4 plate and linear polarization plate is laminated so as to be a right circular polarization plate.

Example 10

The transmission decorative film 10o having the configuration shown in FIG. 22 was manufactured in the same manner as in Example 1, except that the cholesteric liquid crystalline layer R3 was formed on a surface layer film of a laminate G as the second cholesteric liquid crystalline layer, using the laminate G shown below instead of the laminate A.

A method of forming the cholesteric liquid crystalline layer R3 on the surface layer film of the laminate G is the same as the method described in Example 7.

The laminate G is a laminate in which a first λ/4 plate, a linear polarization plate, a second λ/4 plate, a pressure sensitive adhesive layer, and a surface layer film (TAC film) are laminated in this order.

In the laminate G, a combination of the first λ/4 plate and the linear polarization plate is laminated so as to be a left circular polarization plate, and a combination of the second λ/4 plate and linear polarization plate is laminated so as to be a left circular polarization plate.

Example 11

The transmission decorative film 10p having the configuration shown in FIG. 23 was manufactured in the same manner as in Example 1, except that the cholesteric liquid crystalline layer R2 was used as the second cholesteric liquid crystalline layer.

Example 12

As Example 12, the transmission decorative film 10d having the configuration shown in FIG. 8 was manufactured.

(Formation of Cholesteric Liquid Crystalline Layer)

The cholesteric liquid crystalline ink solution A was applied onto a temporary support with a wire bar by using a PET (polyethylene terephthalate, COSMOSHINE A4100) film manufactured by Toyobo Co., Ltd. having a thickness of 100 µm as the temporary support. The coating was performed at room temperature by adjusting a thickness of a coating after drying becomes approximately 2 to 5 µm.

Then, the UV irradiation was performed with respect to the coating for a certain time through a black mask having a predetermined opening pattern, under oxygen atmosphere at room temperature. Then, the UV irradiation was performed for a certain time after removing the mask.

Next, the temporary support on which the coating after the UV irradiation was laminated, was left on a hot plate at 100° C. for 1 minute, and the heat treatment was performed.

Then, the UV irradiation was performed with respect to the coating after the heating treatment for a certain time under nitrogen atmosphere (oxygen concentration of 500 ppm or less) at room temperature, to cure the coating, and a reflection layer R1 including two or more kinds of reflection regions having different selective reflection wavelengths was formed.

The cholesteric liquid crystalline ink solution A was applied onto the formed reflection layer R1 with a wire bar. The coating was performed at room temperature by adjusting a thickness of a coating after drying becomes approximately 2 to 5 µm.

Then, the UV irradiation was performed with respect to the coating for a certain time through a black mask having a predetermined opening pattern, under oxygen atmosphere at room temperature. Then, the UV irradiation was performed for a certain time after removing the mask.

Next, the temporary support on which the coating after the UV irradiation was laminated, was left on a hot plate at 100° C. for 1 minute, and the heat treatment was performed.

Then, the UV irradiation was performed with respect to the coating after the heating treatment for a certain time under nitrogen atmosphere (oxygen concentration of 500 ppm or less) at room temperature, to cure the coating, and a reflection layer R2 including two or more kinds of reflection regions having different selective reflection wavelengths was formed.

The cholesteric liquid crystalline ink solution A was further applied onto the formed reflection layer R2 with a wire bar. The coating was performed at room temperature by adjusting a thickness of a coating after drying becomes approximately 2 to 5 µm.

Then, the UV irradiation was performed with respect to the coating for a certain time through a black mask having a predetermined opening pattern, under oxygen atmosphere at room temperature. Then, the UV irradiation was performed for a certain time after removing the mask.

Next, the temporary support on which the coating after the UV irradiation was laminated, was left on a hot plate at 100° C. for 1 minute, and the heat treatment was performed.

Then, the UV irradiation was performed with respect to the coating after the heating treatment for a certain time under nitrogen atmosphere (oxygen concentration of 500 ppm or less) at room temperature, to cure the coating, and a reflection layer R3 including two or more kinds of reflection regions having different selective reflection wavelengths was formed, and a cholesteric liquid crystalline layer R4 formed by laminating three reflection layers was formed.

The reflection layer R1, the reflection layer R2, and the reflection layer R3 have different the UV irradiation amount before the heating, and have selective reflection wavelengths which are at least partially different from each other.

The cholesteric liquid crystalline layer R4 used as the first cholesteric liquid crystalline layer and the cholesteric liquid crystalline layer R4 used as the second cholesteric liquid crystalline layer were respectively formed by using masks having different opening patterns.

(Transfer of Cholesteric Liquid Crystalline Layer)

The first cholesteric liquid crystalline layer was bonded onto the first λ/4 plate of the laminate A through a pressure sensitive adhesive layer, and the second cholesteric liquid crystalline layer was bonded onto the second λ/4 plate through a pressure sensitive adhesive layer, and accordingly, a transmission decorative film was manufactured.

Example 13

The transmission decorative film 10e having the configuration shown in FIG. 9 was manufactured in the same manner as in Example 12, except that a cholesteric liquid crystalline layer L4 was formed by forming three reflection layers using the cholesteric liquid crystalline ink solution B instead of the cholesteric liquid crystalline ink solution A, and the laminate B was used instead of the laminate A.

Example 14

The transmission decorative film 10f having the configuration shown in FIG. 10 was manufactured in the same manner as in Example 12, except that the cholesteric liquid crystalline layer L4 was used as the second cholesteric liquid crystalline layer and the laminate C was used instead of the laminate A.

Example 15

The transmission decorative film 10q shown in FIG. 24 was manufactured in the same manner as in Example 1, except that a base material film obtained by performing a rubbing treatment to a PET (polyethylene terephthalate, COSMOSHINE A4100) film manufactured by Toyobo Co., Ltd. having a thickness of 100 µm, was used as the temporary support used in the formation of the cholesteric liquid crystalline layer, and the cholesteric liquid crystalline layer was bonded onto the λ/4 plate together with the base material film, without peeling off the cholesteric liquid crystalline layer from the base material film, after forming the cholesteric liquid crystalline layer.

Example 16

The transmission decorative film 10r shown in FIG. 25 was manufactured in the same manner as in Example 1, except that the following acrylic solution was bar-coated on a PET (polyethylene terephthalate, COSMOSHINE A4100) film manufactured by Toyobo Co., Ltd. having a thickness of 100 µm, as the temporary support used in the formation of the cholesteric liquid crystalline layer, so as to have a film thickness of approximately 5 µm, the cholesteric liquid crystalline layer was formed on a laminated film using the laminated film cured by performing the UV irradiation at 300 mJ/cm$^2$ at 60° C., and the cholesteric liquid crystalline layer was bonded onto the λ/4 plate together with the laminated film, without peeling off the cholesteric liquid crystalline layer from the laminated film.

Composition of Acrylic Solution

VANARESIN GH-1203 (manufactured by Shin-Nakamura Chemical Co., Ltd.): 50 parts by mass VISCOAT #360 (manufactured by Osaka Organic Chemical Industry Ltd.): 50 parts by mass IRGACURE 819 (manufactured by BASF): 4 parts by mass Horizontal alignment agent 1: 0.01 parts by mass The concentration of solid content was adjusted so as to be 30 wt % with MEK/MIBK (methyl isobutyl ketone) (1/1 wt %).

Example 17

A filling layer and a surface protective layer were further formed on the transmission decorative film manufactured in Example 4, and accordingly, the transmission decorative film 10s shown in FIG. 26 was manufactured.

Specifically, after bonding a cholesteric liquid crystalline layer onto a λ/4 plate, a plurality of pressure sensitive adhesive sheets (MCS70: manufactured by Mecanusa Inc.) which is cut out in accordance with the shape of the cholesteric liquid crystalline layer as the filling layer were laminated so as to have the same thickness as that of the cholesteric liquid crystalline layer, and a PET film (manufactured by Toyobo Co., Ltd., COSMOSHINE A4100, 100 μm) was bonded thereto as a surface protective layer, and accordingly, a transmission decorative film was manufactured.

Example 18

A filling layer was further formed on the transmission decorative film manufactured in Example 4, and accordingly, the transmission decorative film 10t shown in FIG. 27 was manufactured.

Specifically, after bonding a cholesteric liquid crystalline layer onto a λ/4 plate, a solution for a filling layer shown below was bar-coated from the top of the cholesteric liquid crystalline layer so as to have a film thickness of approximately 6 μm, and the UV irradiation at 300 mJ/cm$^2$ at 60° C. for curing.

Composition of Solution for Filling Layer

VANARESIN GH-1203 (manufactured by Shin-Nakamura Chemical Co., Ltd.): 50 parts by mass VISCOAT #360 (manufactured by Osaka Organic Chemical Industry Ltd.): 50 parts by mass IRGACURE 819 (manufactured by BASF): 4 parts by mass Horizontal alignment agent 1: 0.01 parts by mass The concentration of solid content was adjusted so as to be 30 wt % with MEK/MIBK (methyl isobutyl ketone) (1/1 wt %).

<Evaluation>

Regarding the transmission decorative film manufactured in each example, the observation was performed from the first cholesteric liquid crystalline layer side (front side) and the second cholesteric liquid crystalline layer side (rear side). In all of the examples, transparency was obtained, only a front image was visually recognized from the front side, and only a rear image was visually recognized from the rear side.

Regarding Example 4, Example 17, and Example 18, the manufactured transmission decorative films were observed from the first cholesteric liquid crystalline layer side (front side) and the second cholesteric liquid crystalline layer side (rear side) by holding up the transmission decorative films to a fluorescent light. In the transmission decorative film of Example 4, the pattern of the cholesteric liquid crystalline layer formed on the surface on the opposite side was easily visually recognized, but in the transmission decorative films of Example 17 and Example 18, the pattern of the cholesteric liquid crystalline layer formed on the surface on the opposite side was hardly visually recognized.

From the above results, the effect of the present invention is clear.

EXPLANATION OF REFERENCES 10a to 10t: transmission decorative film
12: linear polarization plate
13, 25: laminate
14a: λ/4 plate
14b: λ/4 plate
15: circular polarization plate
15ra: first right circular polarization plate
15rb: second right circular polarization plate
15la: first left circular polarization plate
15lb: second left circular polarization plate
16: pressure sensitive adhesive layer
18: cholesteric liquid crystalline layer
18ra, 18rc, 18re, 18rg, 18ri, 18la, 18lc, 18lg: first cholesteric liquid crystalline layer
18rb, 18rd, 18rf, 18rh, 18rj, 18lb, 18ld, 18lh: second cholesteric liquid crystalline layer
19ra, 19rb, 19rc, 19rd, 19re, 19rf, 19la, 19lb, 19lc: reflection layer
20rR: red right circular polarization reflection region
20rG: green right circular polarization reflection region
20rB: blue right circular polarization reflection region
20rI: infrared right circular polarization reflection region
20lR: red left circular polarization reflection region
20lG: green left circular polarization reflection region
20lB: blue left circular polarization reflection region
20lI: infrared left circular polarization reflection region
21a: coating
21b: partially exposed coating
21c: exposed coating
21d: heated coating
22: surface layer film
25: laminate
26: surface protective layer
28: scattering layer
30a, 30b: filling layer
Lr1: right circularly polarized light in a direction
Ll1: left circularly polarized light in a direction
Lr2: right circularly polarized light in b direction
Ll2: left circularly polarized light in b direction
S: exposure apparatus
H: heating device
UV: ultraviolet light irradiation device
P: pen type coating device

What is claimed is:

1. A transmission decorative film comprising:
a linear polarization plate;
a first λ/4 plate laminated on one main surface of the linear polarization plate;
a first cholesteric liquid crystalline layer laminated on the first λ/4 plate;
a second λ/4 plate laminated on the other main surface of the linear polarization plate; and
a second cholesteric liquid crystalline layer laminated on the second λ/4 plate,
wherein the first cholesteric liquid crystalline layer and the second cholesteric liquid crystalline layer respectively have wavelength selective reflectivity and reflect right circularly polarized light or left circularly polarized light at a selective reflection wavelength.

2. The transmission decorative film according to claim 1, wherein at least one of the first cholesteric liquid crystalline layer or the second cholesteric liquid crystalline layer includes two or more reflection regions having different selective reflection wavelengths.

3. The transmission decorative film according to claim 2, wherein the first cholesteric liquid crystalline layer and the second cholesteric liquid crystalline layer respectively include two or more reflection regions having different selective reflection wavelengths, and
a formation pattern in the reflection region of the first cholesteric liquid crystalline layer and a formation pattern in the reflection region of the second cholesteric liquid crystalline layer, are different from each other, when seen from one main surface side of the linear polarization plate.

4. The transmission decorative film according to claim 3, wherein at least one of the first cholesteric liquid crystalline layer or the second cholesteric liquid crystalline layer is laminated on a part of the first λ/4 plate or the second λ/4 plate.

5. The transmission decorative film according to claim 4, further comprising:
a filling layer which covers a side surface of the cholesteric liquid crystalline layer laminated on a part of the λ/4 plate and a surface of the λ/4 plate where the cholesteric liquid crystalline layer is not formed.

6. The transmission decorative film according to claim 5, wherein a surface of the filling layer is flush with the surface of the cholesteric liquid crystalline layer.

7. The transmission decorative film according to claim 6, wherein a combination of the linear polarization plate and the first λ/4 plate functions as a circular polarization plate which transmits circularly polarized light having a revolution direction which is opposite to that of circularly polarized light reflected by the first cholesteric liquid crystalline layer, and
a combination of the linear polarization plate and the second λ/4 plate functions as a circular polarization plate which transmits circularly polarized light having a revolution direction which is opposite to that of circularly polarized light reflected by the second cholesteric liquid crystalline layer.

8. The transmission decorative film according to claim 7, wherein at least one of the first cholesteric liquid crystalline layer or the second cholesteric liquid crystalline layer is formed by laminating two or more reflection layers having different selective reflection wavelengths at least in a part of region in a plane direction.

9. The transmission decorative film according to claim 5, wherein a thickness of the filling layer is equal to or greater than a thickness of the cholesteric liquid crystalline layer.

10. The transmission decorative film according to claim 9, wherein a combination of the linear polarization plate and the first λ/4 plate functions as a circular polarization plate which transmits circularly polarized light having a revolution direction which is opposite to that of circularly polarized light reflected by the first cholesteric liquid crystalline layer, and
a combination of the linear polarization plate and the second λ/4 plate functions as a circular polarization plate which transmits circularly polarized light having a revolution direction which is opposite to that of circularly polarized light reflected by the second cholesteric liquid crystalline layer.

11. The transmission decorative film according to claim 10, wherein at least one of the first cholesteric liquid crystalline layer or the second cholesteric liquid crystalline layer is formed by laminating two or more reflection layers having different selective reflection wavelengths at least in a part of region in a plane direction.

12. The transmission decorative film according to claim 1, wherein at least one of the first cholesteric liquid crystalline layer or the second cholesteric liquid crystalline layer is laminated on a part of the first λ/4 plate or the second λ/4 plate.

13. The transmission decorative film according to claim 12, further comprising:
a filling layer which covers a side surface of the cholesteric liquid crystalline layer laminated on a part of the λ/4 plate and a surface of the λ/4 plate where the cholesteric liquid crystalline layer is not formed.

14. The transmission decorative film according to claim 13, wherein a surface of the filling layer is flush with the surface of the cholesteric liquid crystalline layer.

15. The transmission decorative film according to claim 13, wherein a thickness of the filling layer is equal to or greater than a thickness of the cholesteric liquid crystalline layer.

16. The transmission decorative film according to claim 1, wherein a combination of the linear polarization plate and the first λ/4 plate functions as a circular polarization plate which transmits circularly polarized light having a revolution direction which is opposite to that of circularly polarized light reflected by the first cholesteric liquid crystalline layer, and
a combination of the linear polarization plate and the second λ/4 plate functions as a circular polarization plate which transmits circularly polarized light having a revolution direction which is opposite to that of circularly polarized light reflected by the second cholesteric liquid crystalline layer.

17. The transmission decorative film according to claim 1, wherein at least one of the first cholesteric liquid crystalline layer or the second cholesteric liquid crystalline layer is formed by laminating two or more reflection layers having different selective reflection wavelengths at least in a part of region in a plane direction.

* * * * *